United States Patent
Hanay et al.

[11] Patent Number: 6,079,669
[45] Date of Patent: Jun. 27, 2000

[54] DUAL PIVOT EXPANDABLE LAVATORY

[75] Inventors: James J. Hanay, Seattle; Richard J. Laconte, Black Diamond; Allan B. Lewis, Snohomish; William C. Quan, Newcastle; Peter J. Arnold, Seattle, all of Wash.

[73] Assignee: The Boeing Company, Seattle, Wash.

[21] Appl. No.: 08/822,030

[22] Filed: Mar. 24, 1997

[51] Int. Cl.[7] .............................. B64D 11/00; B64C 1/00; E03D 11/12; E04B 1/346

[52] U.S. Cl. .................................. 244/118.5; 244/129.1; 4/312; 52/65

[58] Field of Search ............................. 244/118.5, 118.6, 244/119, 129.1, 129.4, 129.5; 4/312; 52/65

[56] References Cited

U.S. PATENT DOCUMENTS

| | | |
|---|---|---|
| 1,850,747 | 3/1932 | Flagg . |
| 2,188,562 | 1/1940 | Anderson et al. ........................... 4/312 |
| 2,443,214 | 6/1948 | Williams ..................................... 4/312 |
| 2,681,016 | 6/1954 | Candlin, Jr. .............................. 105/315 |
| 2,760,443 | 8/1956 | Gobrecht ................................. 105/315 |
| 2,914,001 | 11/1959 | Murphy .................................. 105/315 |
| 3,898,704 | 8/1975 | Gallaher et al. ................................ 5/2 |
| 4,100,857 | 7/1978 | Gutridge et al. ......................... 105/323 |
| 4,589,463 | 5/1986 | Ryan . |
| 4,645,145 | 2/1987 | Alie ....................................... 244/118.5 |
| 4,681,044 | 7/1987 | Dallman .................................. 52/65 X |
| 4,884,767 | 12/1989 | Shibata ................................. 244/118.5 |
| 5,083,727 | 1/1992 | Pompei et al. .................... 244/118.5 X |
| 5,150,863 | 9/1992 | Hozumi ................................. 244/118.5 |
| 5,474,260 | 12/1995 | Schwertfeger et al. ............. 244/118.5 |

FOREIGN PATENT DOCUMENTS

WO 96/11124 4/1996 WIPO ........................... B60R 15/00

OTHER PUBLICATIONS

Article *"McDonnell Douglas eyes office in sky"* Commercial Aviation, New Products & Developments; Author: unknown; Date: unknown; Place of publication: unknown.

*"Accessible Lavatory for the Physically Impaired"* Author: unknown; Date: unknown; Place of publication: unknown.

*Primary Examiner*—Charles T. Jordan
*Assistant Examiner*—Theresa M. Wesson
*Attorney, Agent, or Firm*—William C. Anderson

[57] ABSTRACT

A dual pivot expandable lavatory for use in limited spaces such as on an airplane. The lavatory may be positioned proximate the doorway area of the airplane, and is provided with a primary and a secondary pivotable module. Each module is pivotably attached to a stationary assembly conventionally affixed to the ceiling and floor of the airplane. During take-off and landing both modules are locked, by means of a locking system, in a stowed position within the stationary assembly. During routine flight, the locking system is unlocked and both modules are pivoted into a deployed position within the doorway area. A flight attendant's seat may be affixed to the exterior of the primary module. If the seat is used, an additional support foot is affixed to the primary module to accommodate the additional loading on the lavatory.

16 Claims, 20 Drawing Sheets

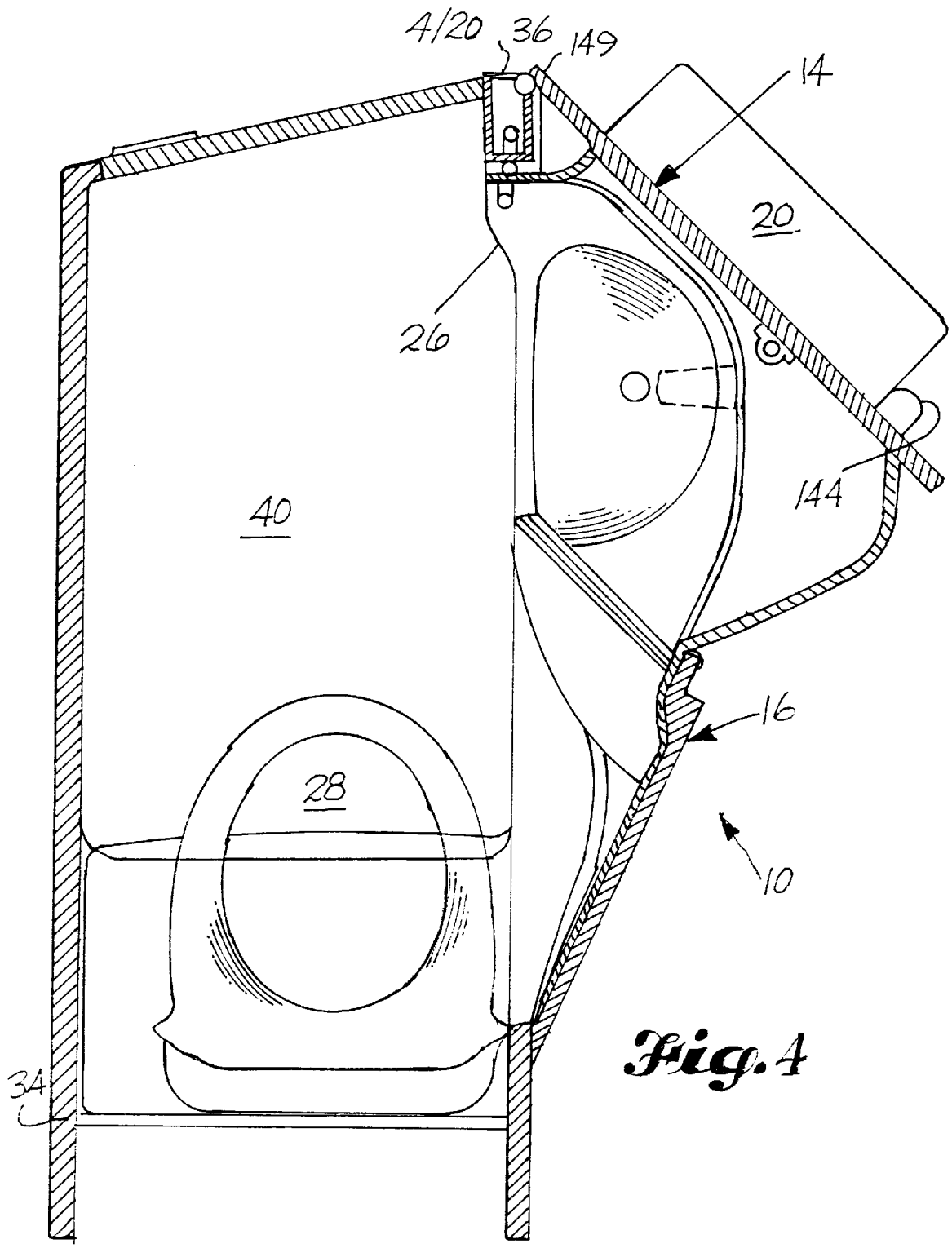

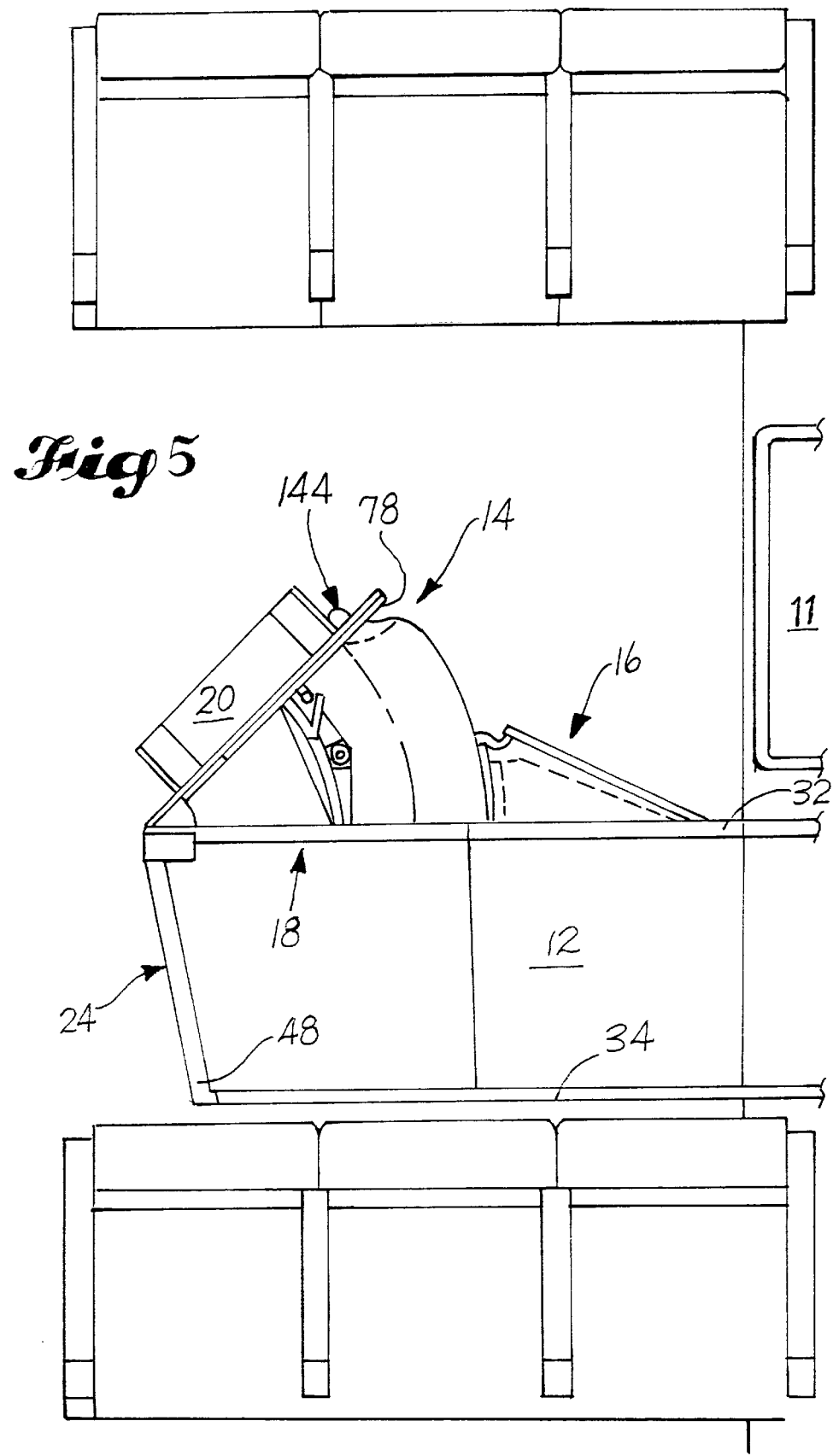

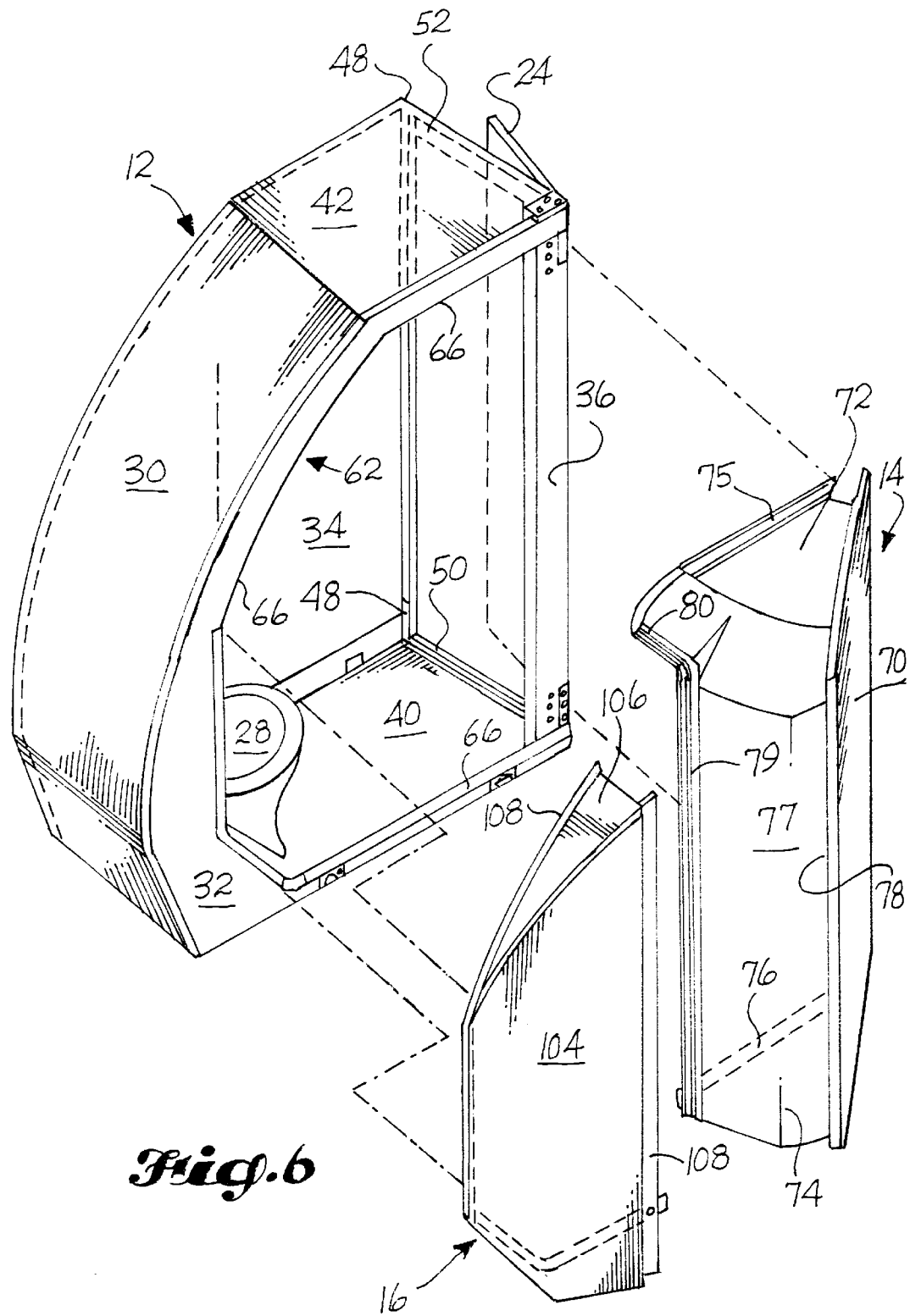

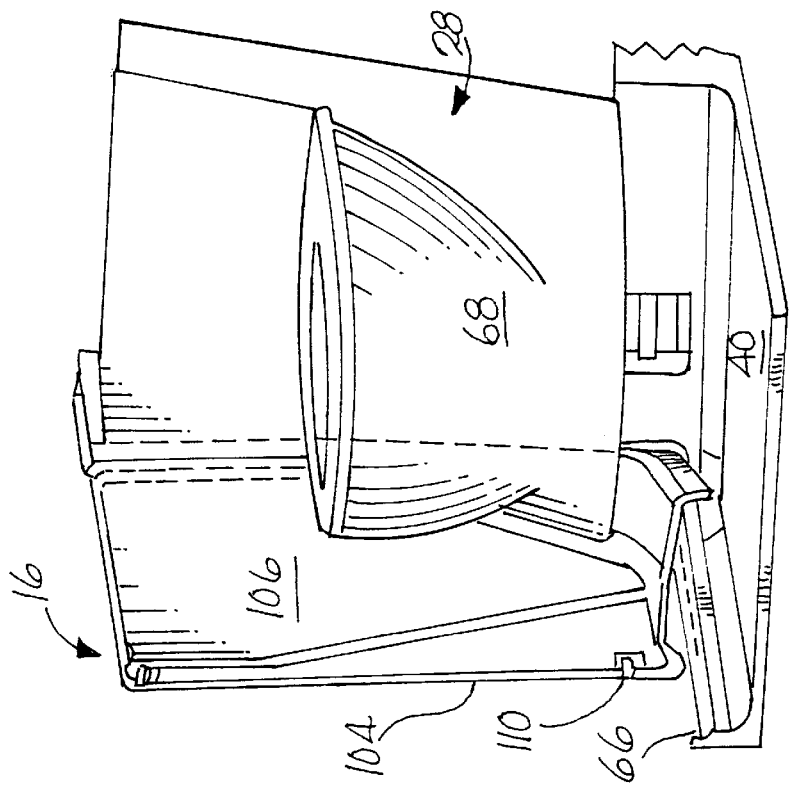
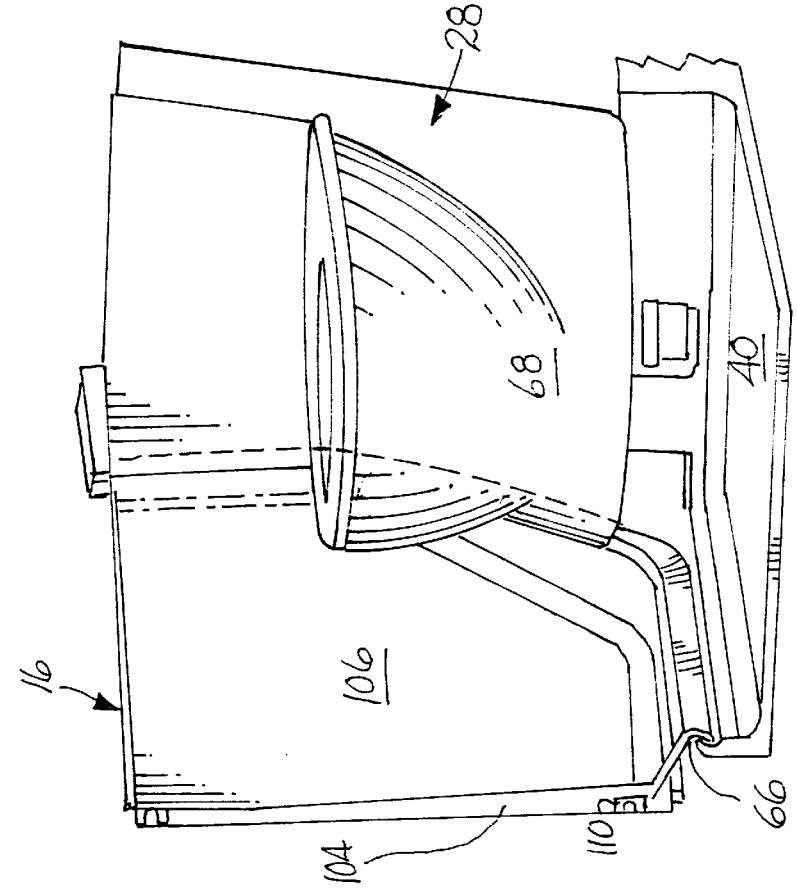

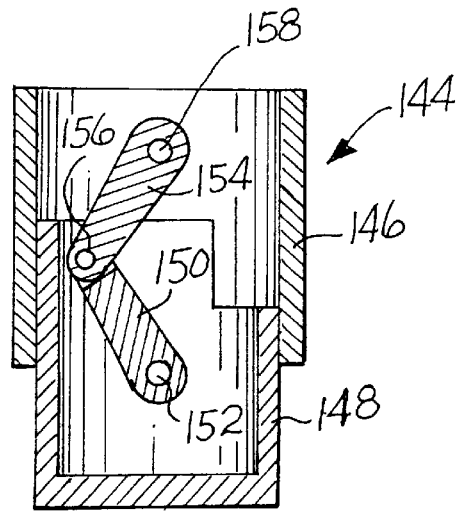
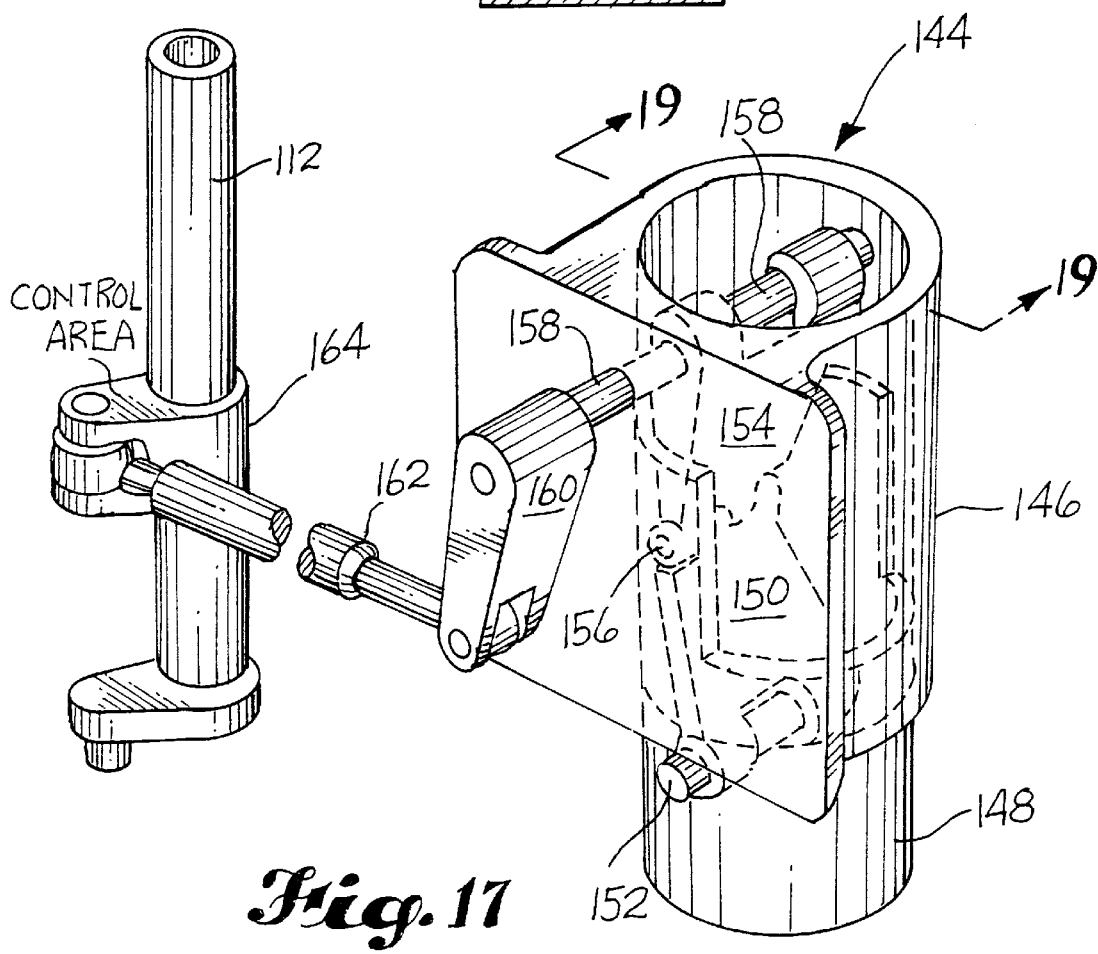

DUAL PIVOT EXPANDABLE LAVATORY

CROSS REFERENCE TO RELATED APPLICATIONS

This invention is related to U.S. patent application Ser. No. 08/772,500, Stowable Module Airplane Lavatory, by Coughren, et al filed Dec. 23, 1996.

FIELD OF THE INVENTION

This invention relates to lavatories. More particularly, the present invention relates to an expandable lavatory for use anywhere space is limited, e.g., on board vehicles such as airplanes. Still more particularly, the instant invention relates to an expandable airplane lavatory that uses passenger doorway space when the airplane is in flight.

BACKGROUND OF THE INVENTION

Providing lavatories on board airplanes is widely known. For examples of fixed assembly lavatories provided on board airplanes, see U.S. Pat. Nos. 5,150,863, issued Sep. 29, 1992, to Hozumi; 4,884,767, issued Dec. 5, 1989, to Shibata; 4,646,145, issued Feb. 24, 1987, to Alie, and 4,589,463, issued May 20, 1986, to Ryan. However, the opportunities of doorway space utilization are not known to Hozumi, Shibata, Alie, or Ryan.

Doorway space utilization is the idea of making use of the floor areas and spaces immediately inboard of commercial airplane exit doors not needed during night. Doorway areas and spaces are normally used only for entry and departure from the airplane while on the ground. The Federal Aviation Authority requires such areas and spaces for emergency exit and attendant assist purposes. However, during normal flight, these areas and spaces are largely unused.

By using doorway areas and spaces during routine flight, there exists an opportunity to increase seat count within an airplane. Seat count gains are the most direct way to increase a customer's perceived value of an airplane. Analysis indicates that each incremental seat added to an airplane of a given gross weight increases the value of the airplane at the time of sale by many hundreds of thousands of dollars. All things being equal, increasing seat count increases revenues, profit, and thus, perceived customer value.

Examples of apparatus providing increased space utilization on an airplane include an expandable volume lavatory disclosed in the aforementioned patent to Ryan and a convertible seat-bed disclosed in U.S. Pat. No. 3,898,704, issued Aug. 12, 1975, to Gallaher, et al. Also available for use on the McDonnell Douglas MD-11 commercial airplane is an accessible expandable lavatory for the physically impaired. When stowed, the lavatory is basically a conventionally sized module. When the need arises or on-demand, the lavatory can be expanded into the passenger doorway area to permit positioning of a wheelchair next to the toilet in the lavatory. However the McDonnell Douglas lavatory is not necessarily deployed during flight; only when there is a need to accommodate the needs of a physically impaired passenger.

SUMMARY OF THE INVENTION

An object of this invention is to provide a expandable lavatory for use in limited spaces.

Another object of the present invention is the provision of an expandable lavatory on board vehicles such as commercial airplanes.

Yet another object of the instant invention is the provision of a lavatory that can be expanded into the unused doorway space of an airplane.

Still another object of the present invention is to increase the revenue generating capability of a commercial airplane.

These and other objects of the present invention are achieved through the provision of a dual pivot expandable lavatory. The lavatory has a primary and a secondary pivoting module pivotably attached to a stationary assembly. If used in an airplane, the stationary assembly may be conventionally affixed to typical floor and ceiling structure proximate a doorway of the airplane. During take-off and landing of the airplane, both modules are locked, by means of a locking system, in a stowed position within the stationary assembly. During routine flight, the locking system is unlocked and both modules may be pivoted into a deployed position within the space or area inboard of the doorway. Sufficient space is left for emergency exit of the airplane. Finally, a flight attendant's seat may be affixed to the exterior of the primary module and a locking foot assembly provided.

BRIEF DESCRIPTION OF THE DRAWINGS

The foregoing and other features and advantages of the present invention will become more readily appreciated by reference to the following detailed description of an embodiment of the invention and the accompanying drawings wherein like numbers refer to the same or similar parts and wherein:

FIG. 3 includes a top view of an optional support foot assembly.

FIG. 4 is a top view, taken along line 4—4 in FIG. 2. FIG. 4 includes a top view of an optional support foot assembly.

FIG. 5 is a top view of the lavatory in a deployed position.

FIG. 6 is an simplified exploded isometric view of the expandable lavatory of the present invention.

FIG. 8 is a partial perspective view illustrating the interface between the secondary pivoting module and the toilet when the lavatory is in a deployed condition.

FIG. 9 is a partial perspective view illustrating the interface between the secondary pivoting module and the toilet when the lavatory is in a stowed position.

FIG. 12 also provides a perspective of an optional support foot assembly.

FIGS. 16 and 17 show an optional support foot assembly in an unengaged and engaged position, respectively.

FIGS. 18 and 19 are side views taken along lines 18—18 and 19—19 in FIGS. 16 and 17, respectively.

DETAILED DESCRIPTION OF THE PREFERRED EMBODIMENT

Figure 1:
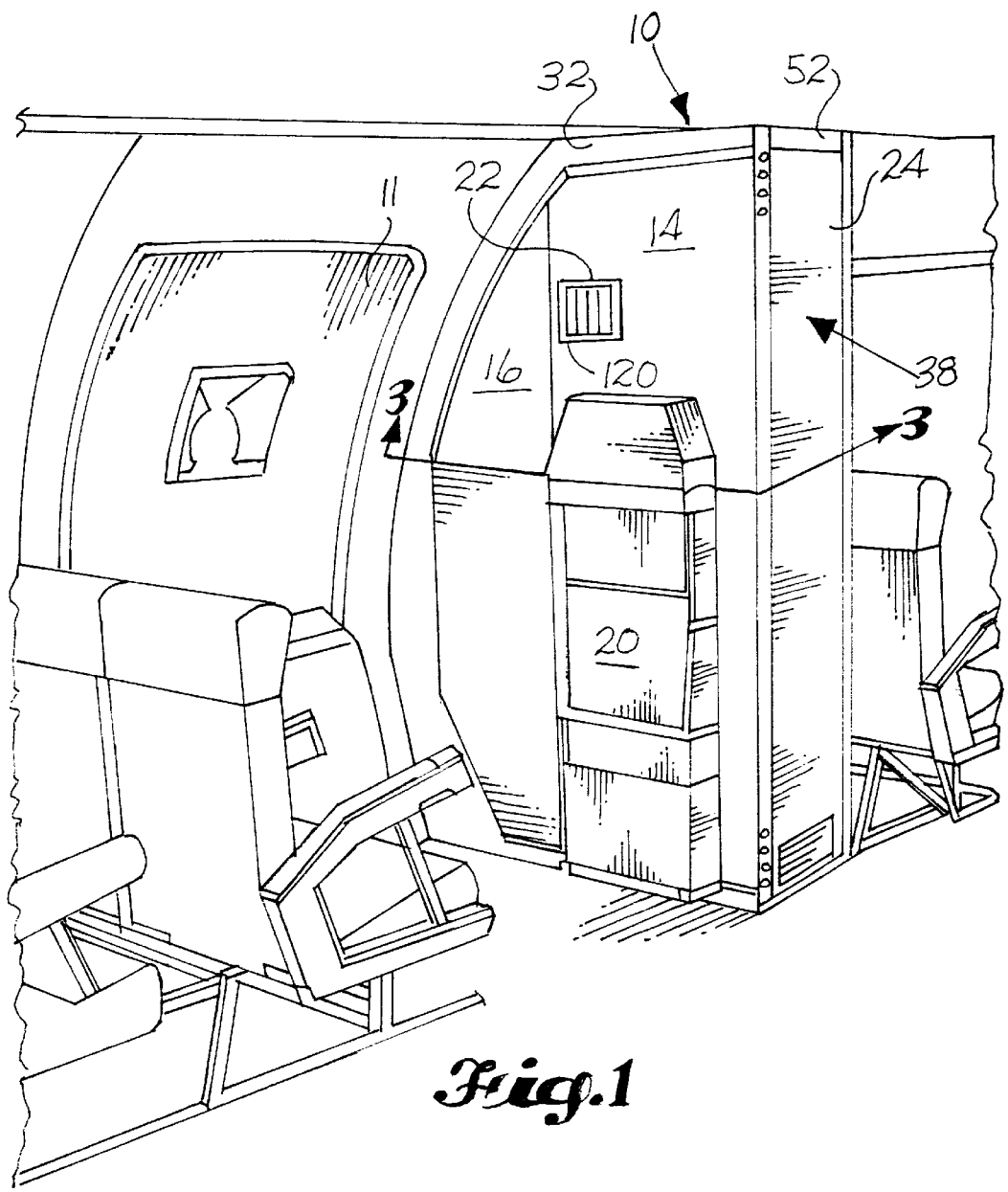
FIG. 1 is a perspective view of the present expandable lavatory in a stowed position proximate a doorway of an airplane.
Figure 2:
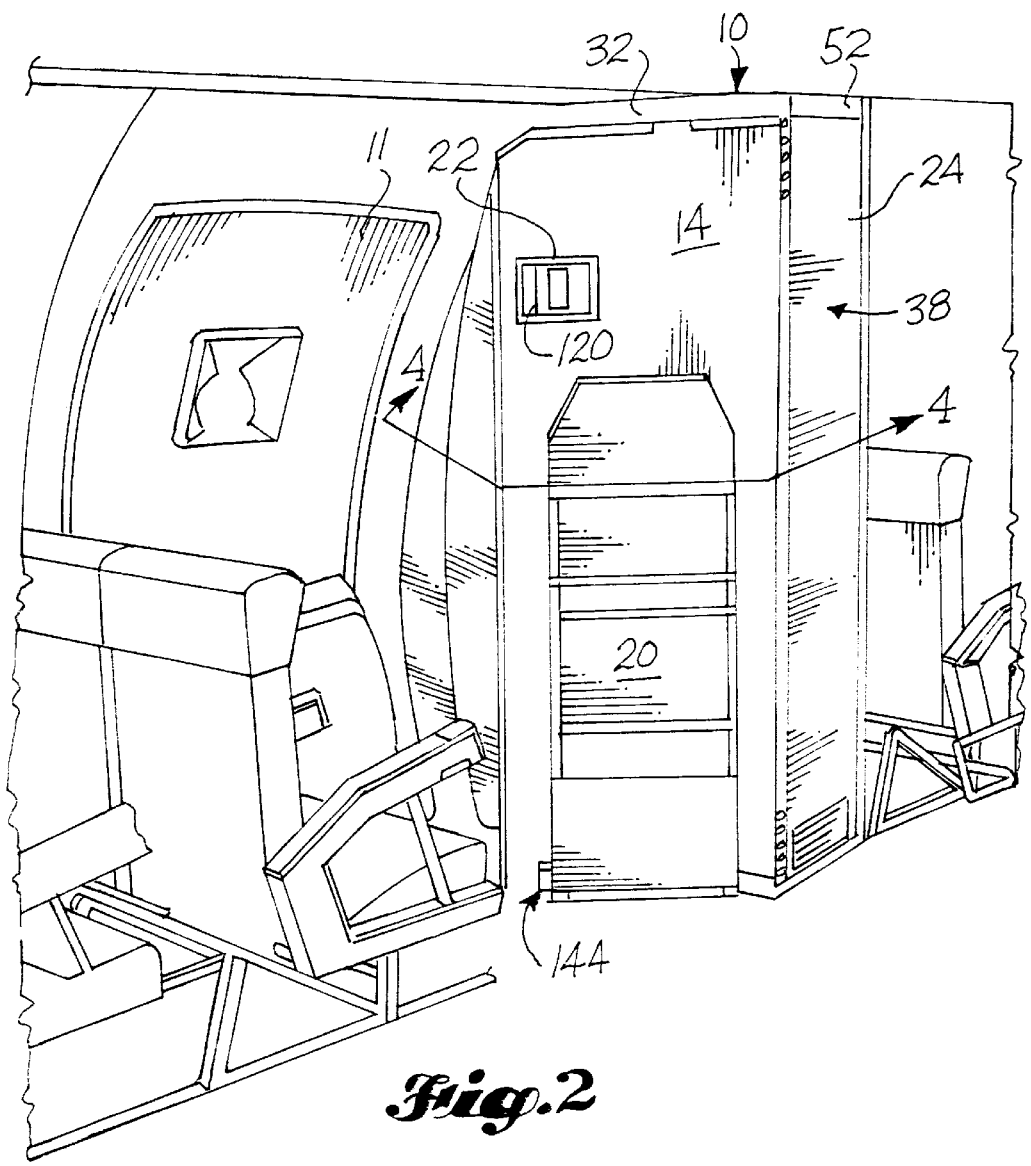
FIG. 2 is a perspective view of the instant lavatory in a deployed position.

As shown in FIGS. 1 and 2, the present expandable lavatory 10 is shown disposed proximate the exit door 111 of an airplane (not shown). As used herein, the terms outboard, inboard, fore and aft have the same meanings ordinarily attributed to these words in an airplane.

The dual pivot expandable lavatory 10 comprises a fixed or stationary sidewall lavatory subassembly 12 (see FIGS. 5 and 6), a primary pivoting module 14, a secondary pivoting module 16, a locking system 18 (not shown in FIGS. 1 or 2, but see FIG. 5 and more particularly FIGS. 12–18) and an optional flight attendant's seat 20.

The lavatory 10 is in the stowed position shown in FIG. 1 when the airplane is on the ground, taxiing, during takeoff, climbout and landing. While on the ground, passengers may be loaded on the airplane or deplaned and operations conducted in a routine manner.

After takeoff and climbout, an attendant would unlock the primary module 14 manually using a latch grab handle 22 and deploy both the primary module 14 and the secondary module 16 into the area or space proximate the doorway 11, as shown in FIG. 2. Once extended, the primary module 14 is relocked, using the latch grab handle 22, in the deployed position. While deployed, access to the inside of the lavatory 10 is through a conventional door 24 whereby the lavatory is available for passenger and crew use.

Figure 3:
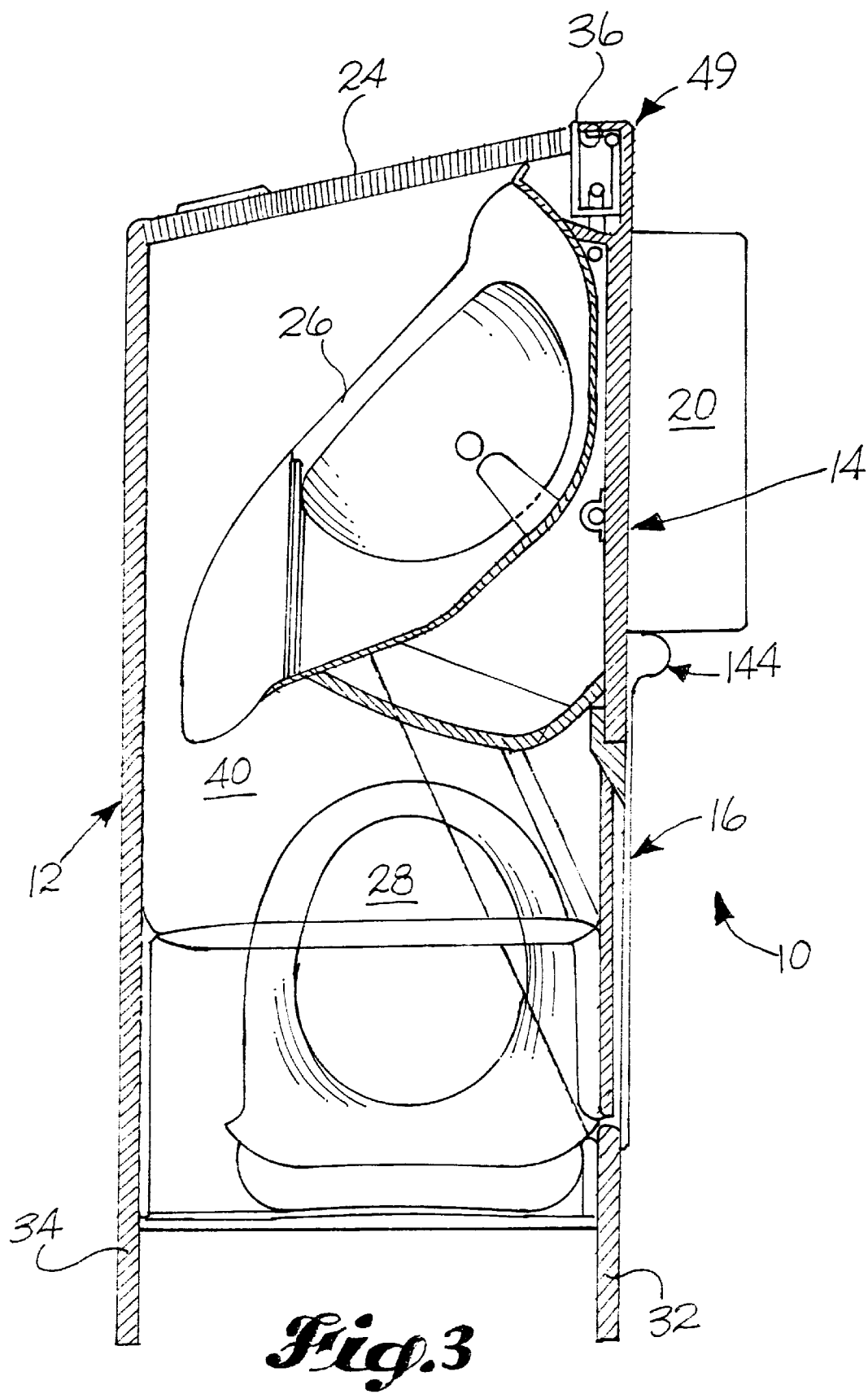
FIG. 3 is a top view, taken along line 3—3 in FIG. 1.

FIGS. 3 and 4 show cross sectional views of the expandable lavatory 10 in the stowed and deployed positions, respectively. As shown in FIG. 3, a conventional sink cabinet 26 and other components are carried by the primary module 14. These components are completely located within the envelope of the stationary sidewall lavatory subassembly 12 proximate a toilet 28 when the lavatory 10 is in a stowed position. When the lavatory is in a deployed state, as shown in FIG. 4 (also see FIG. 7), passengers should not perceive any significant difference between the instant lavatory and a conventional lavatory.

As shown in the top view of FIG. 5, sufficient space remains in the area proximate the doorway 11 for any needed egress. However, in the event of an inflight emergency or during landing preparations, an attendant ordinarily would unlock the primary module 14, pivot it and the secondary module 16 back into the sidewall lavatory subassembly 12, and relock the lavatory 10 in the stowed position shown in FIG. 1. Before the expandable lavatory is stowed, a visual inspection of the interior of the lavatory would be required to ensure that it is unoccupied and free of blockage items. The expandable lavatory 10 would ordinarily remain stowed during final approach and landing. After the airplane has parked at the airport gate, crews could redeploy and service the lavatory 10, as appropriate.

Turning now to FIG. 6, there is shown a simplified exploded perspective view of the dual pivot expandable lavatory 10 of the present invention. The stationary or fixed subassembly 12 is essentially a box configured to coincide with the interior contour of the airplane. The box has a width (fore and aft) which is considerably less than conventional lavatories. For example, a conventional lavatory has a width of between thirty three (33) inches to about thirty six (36) inches. In contrast, the present lavatory 10 is about twenty two (22) inches wide when in a stowed position.

The stationary subassembly 12 is intended to be placed outboard of an aisle of the airplane, but may be suitably positioned anywhere in the airplane. As is obvious the subassembly and thus the lavatory 10 may be repositioned in a direction opposite to that shown.

Figure 6A:
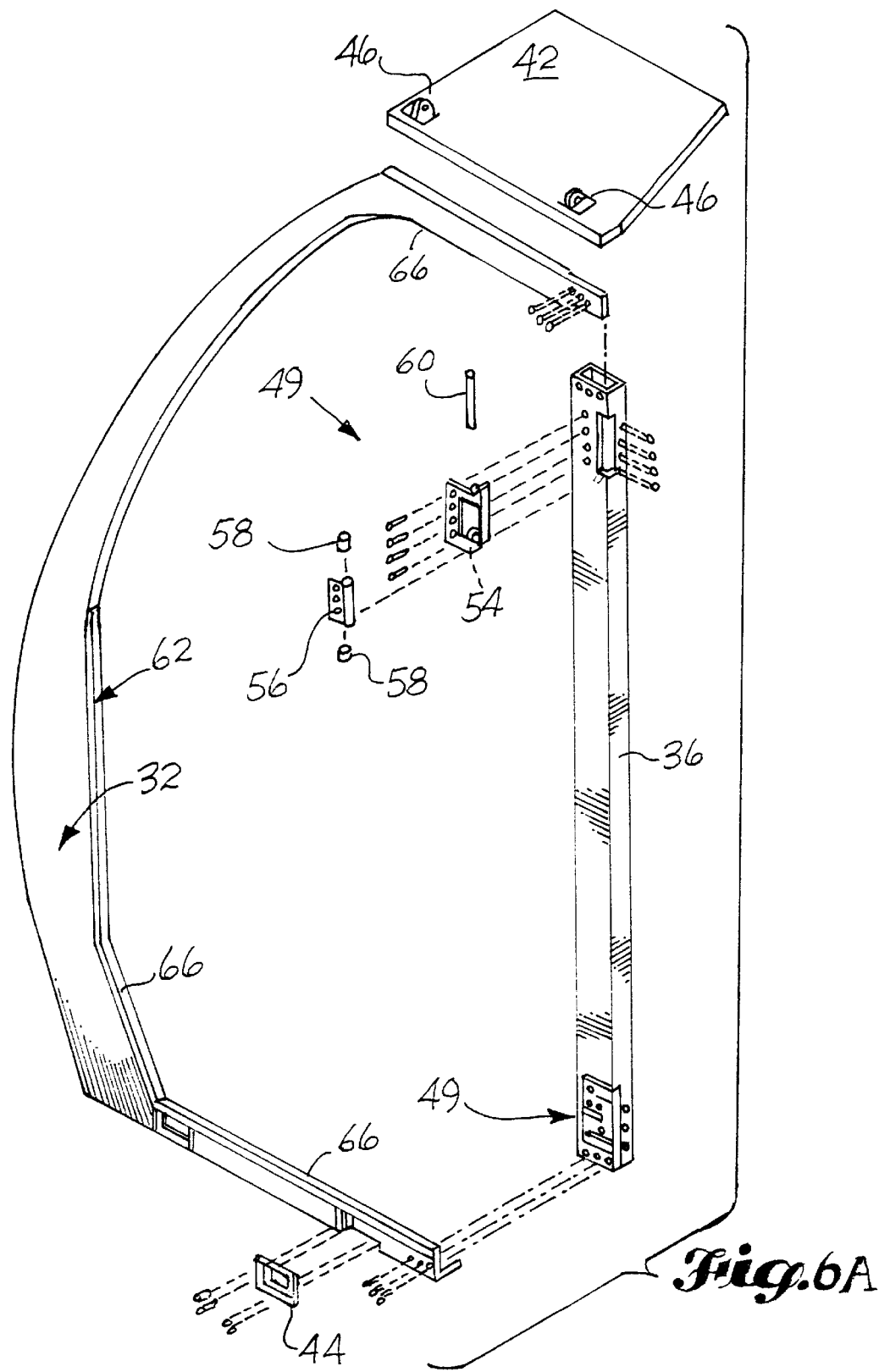
FIG. 6A is an exploded isometric view of a corner post and hinge subassembly used in the present invention.

The fixed subassembly 12 comprises an outboard wall 30, an open aft side wall 32 which permits the pivoting and stowage of the primary module 14 and the secondary module 16, a solid forward side wall 34, a hollow corner post 36, an aisle "wall" 38 (see FIGS. 1 and 7), the conventional lavatory door 24, a fixed floor pan 40, a ceiling 42 and a plurality of conventional lavatory mounts 44 and 46 (not shown in FIG. 6, but see FIG. 6A).

The toilet 28 is affixed to the floor pan 40. The outboard wall 30 supports an amenities console 45 above the toilet (see FIG. 7). The amenities console may contain seat covers, facial tissues, air sick bags and sanitary napkins (not shown). The outboard wall 30, open side wall 32 and the solid side wall 34 are attached to suitable airplane structure (not shown), such as in the flooring and ceiling, by the conventional lavatory mounts 44 and 46, respectively.

As best shown in FIG. 6A, affixed to the open side wall 32 is the corner post 36 to which the primary module 14 is pivotably attached as better shown in and discussed below with respect to FIG. 6A. Also see FIGS. 3 and 4. In addition to the corner post 36, the aisle "wall" 38 comprises a returned edge 48 (see FIGS. 4 and 5) on the forward side wall 34, a threshold 50 and a header 52. The lavatory door 24 is suitably hinged by a conventional means, not shown, to the corner post 36.

While not shown in FIG. 6A (but see FIGS. 3 and 4), the primary module 14 is pivotably attached to the corner post 36 by means of a pair of hinge subassemblies 49 disposed at the upper and lower portions of the corner post 36. The hinge subassembly disposed at the upper portion of the corner post 36 is shown in exploded form detail in FIG. 6A whereas the lower hinge subassembly is shown installed in the corner post 36. Each hinge subassembly 49 comprises a fixed mounting plate 54 suitably attached within a recess formed in the post 36, a pivoting mounting plate 56, thrust bearings 58 and a conventional hinge pin 60. The pivoting mounting plate 56 is pivotably attached to the fixed mounting plate by means of the thrust bearings 58 and the hinge pin 60. In turn, the pivoting mounting plate 56 attaches to the primary pivoting module 14 as shown in a simplified way in FIGS. 3, 4 and 6.

The open wall 32 has an outline 62 which is configured to accommodate the shapes of both the primary pivoting module 14 and the secondary pivoting module 16 whereby in use both modules may be positioned in a stowed and a deployed position. Except for a slot 64 (not shown in either FIGS. 6 or 6A, but see FIGS. 12 and 13) which cooperates with the locking system 18 to be described later, the edge of the perimeter of the outline 62 is provided with an elastomeric seal 66. The seal 66 is provided on both the exterior surface and the interior surface of the edge of the outline 62 and cooperates with complementary surfaces of the primary pivoting module 14 and the secondary pivoting module 16 so that in use no objectionable odors or noise are detectable from the lavatory. The seal 66 also permits an occupant of the lavatory 10 to have privacy when the lavatory is in its deployed position.

As perhaps best shown in FIGS. 3 and 4, the toilet 28 is offset toward the expanding side of the lavatory 10. This offset provides an occupant with sufficient shoulder space when the lavatory 10 is in an expanded or deployed state. As shown in FIG. 9, the undersurface of a toilet shroud 68, which is attached to the outboard wall 30, stops above the lower portion of the secondary pivoting module 16 and the floor pan 40 which is fixed within the stationary subassembly 12. The undersurface of the shroud 68 and the floor pan 40 are shaped or contoured to receive the secondary pivotable module 16 when the lavatory 10 is in a stowed position.

As shown in FIG. 6, the primary pivoting module 14 comprises a primary moving wall 70 having, a shape complementary to the inboard portion of the outline 62 and having a dimension that is slighter greater than that outline portion. The primary moving wall 70 is attached to the pivoting mounting plates 56 and is suitably attached to a top panel 72 and a bottom panel 74. In a deployed position, an upper flange 75 formed on the top panel 72 and a lower flange 76 formed on the bottom panel 74 press against the seal 66 on the interior edge of the outline 62 and assist in forming, the conventional looking lavatory 10 shown in FIG. 7.

The primary pivoting, module 14 also comprises a primary shell 77 which is somewhat smaller than the primary moving wall 70 thereby forming a primary moving wall overlap 78 (better shown in FIG. 5). As shown in FIG. 6, the primary shell 77 may be made integral with the top panel 72 and the bottom panel 74. A lip 79 extends along the outboard exterior edge of the shell 77 from the bottom panel 74 to the top panel 72. An elastomeric center seal 80 is disposed over the lip 79 and cooperates with the perimeter seal 66 formed over the outline 62 ill the open wall 32 to mitigate undesirable odors and noises.

Figure 7:
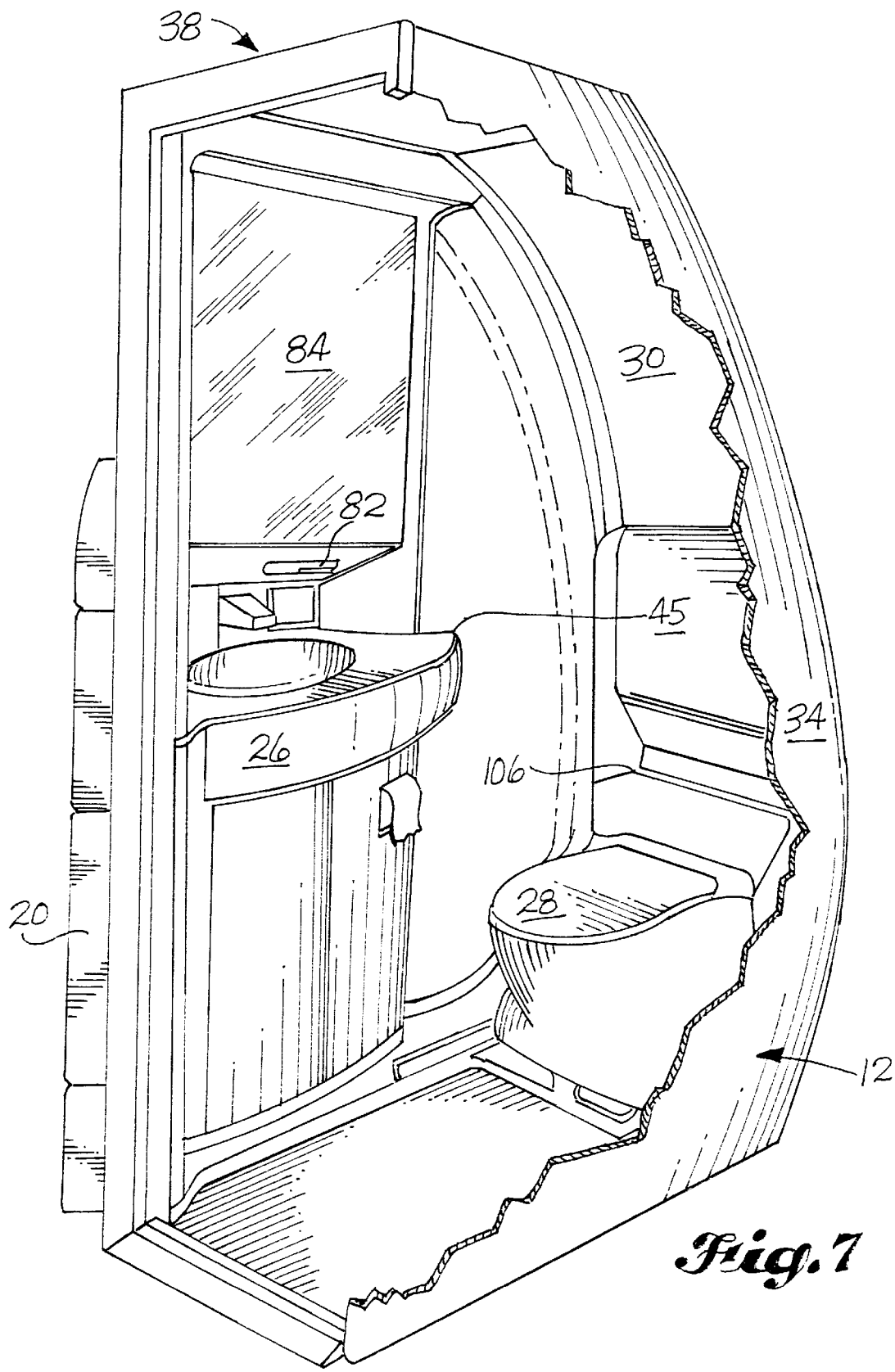
FIG. 7 is a cut away view showing the interior of the present lavatory in a deployed position.
Figure 10:
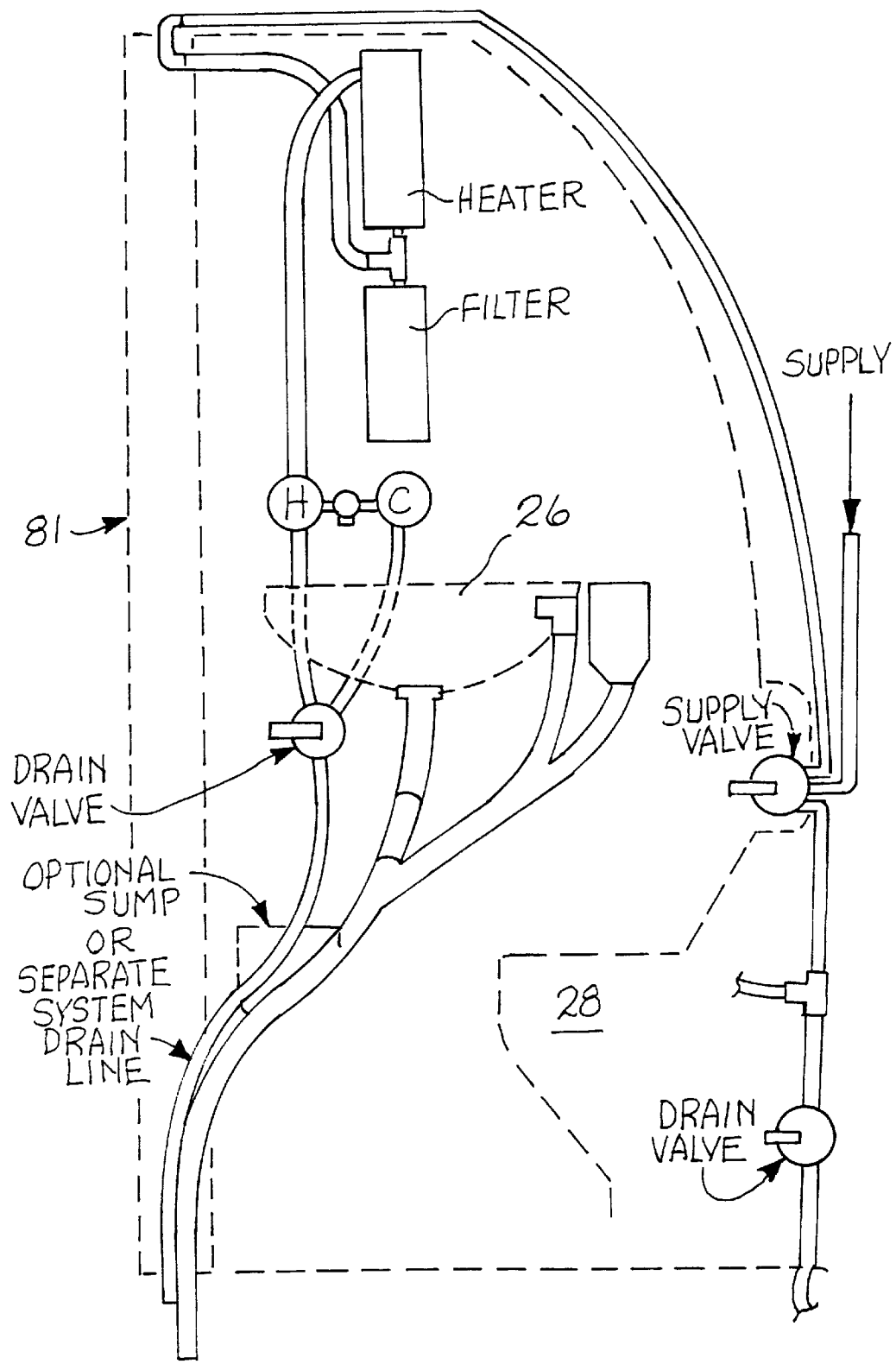
FIG. 10 is one embodiment of the plumbing and other equipment positioned within the primary pivoting module of the present invention.
Figure 11:
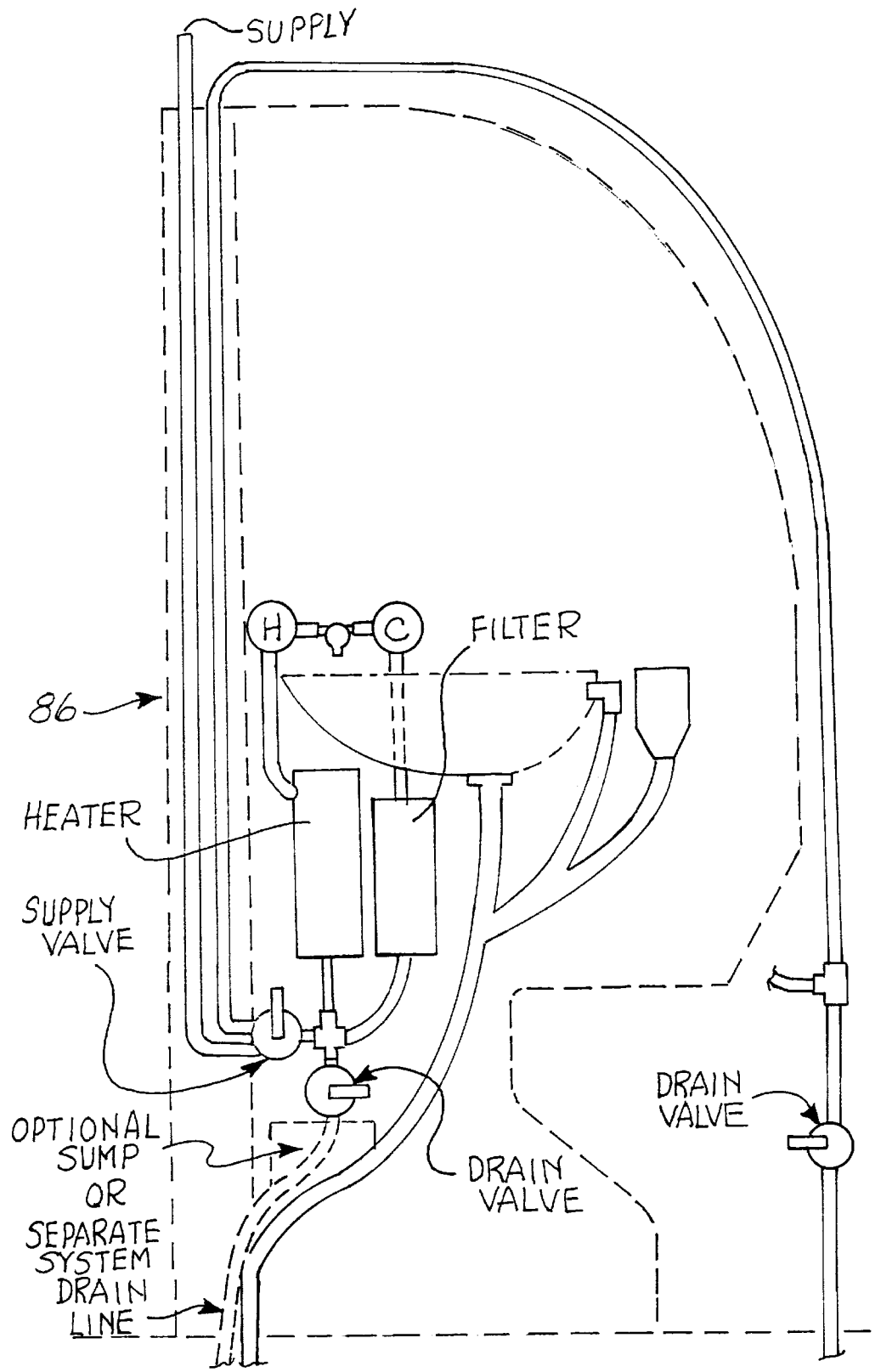
FIG. 11 is another embodiment of the plumbing and other equipment positioned within the primary pivoting module of the present invention.

As shown in FIGS. 7 and 10, suitably affixed within the primary shell are typical amenities and a plumbing system 81. The amenities may include the sink cabinet 26, a trash receptacle 82, mirror 84, light (not shown), and other typical amenities, such as cups, soap, hand towels, not shown in FIG. 7. FIG. 10 illustrates the plumbing system 81 which comprises a conventional supply line, supply valve for both the sink cabinet 26 and the toilet 28, toilet drain valve, water heater, water filter, hot and cold valves, a system drain valve, and a gray water plumbing subsystem. The gray water plumbing subsystem could either include an optional sump or a separate system drain line. An alternative configuration 86 for the plumbing system used in connection with the present invention is shown in FIG. 11.

As will be seen, the primary module 14 cooperates with the secondary pivoting module 16 to form the lavatory 10 of the present invention. As seen in FIG. 6, the secondary module comprises a secondary moving wall 104, a secondary shell 106 having a continuous flange 108 about its interior periphery, guide rollers 110 mounted on the inboard edge of the secondary moving wall 104 (see FIGS. 8 and 9) and a conventional continuous pivotable hinge (not shown).

The secondary moving wall 104 is pivotably attached by the continuous pivotable hinge to the outboard portion of the outline 62 of the open wall 32 and is sized to slightly overlap the outline when the lavatory 10 is in a stowed position. The inboard edge of the secondary moving wall 104 is configured as a recessed flange 108 which sealingly cooperates with and is covered by the primary moving wall overlap 78 in a stowed position. In that stowed position, the secondary module 16 is trapped between the primary moving wall overlap 78 and the open wall 32. As a consequence, the primary moving wall 70 and the secondary moving wall 104 present, in the stowed position, a substantially continuous, smooth surface to the airplane passengers (see FIGS. 1, 3 and 20).

As alluded to above, when stowing the present expandable lavatory 10, the secondary shell 106 of the secondary pivotable module 16 slides under the toilet shroud 68 and above the floor pan 40; see FIG. 9. When in the deployed position, the secondary shell 106 is placed in intimate contact with the perimeter seal 66 formed over the edge of the outline edge 62; see FIGS. 7 and 8. In the deployed position, the secondary shell flanges 108 stop against the perimeter seal 66 on the inside surface of the open wall 32 preventing further outward movement of the secondary module 16. The center seal 80 on the primary shell 77 makes contact with the inboard edge of the secondary shell 106 preventing movement of the secondary shell inwardly toward the stationary subassembly 12.

Figure 12:
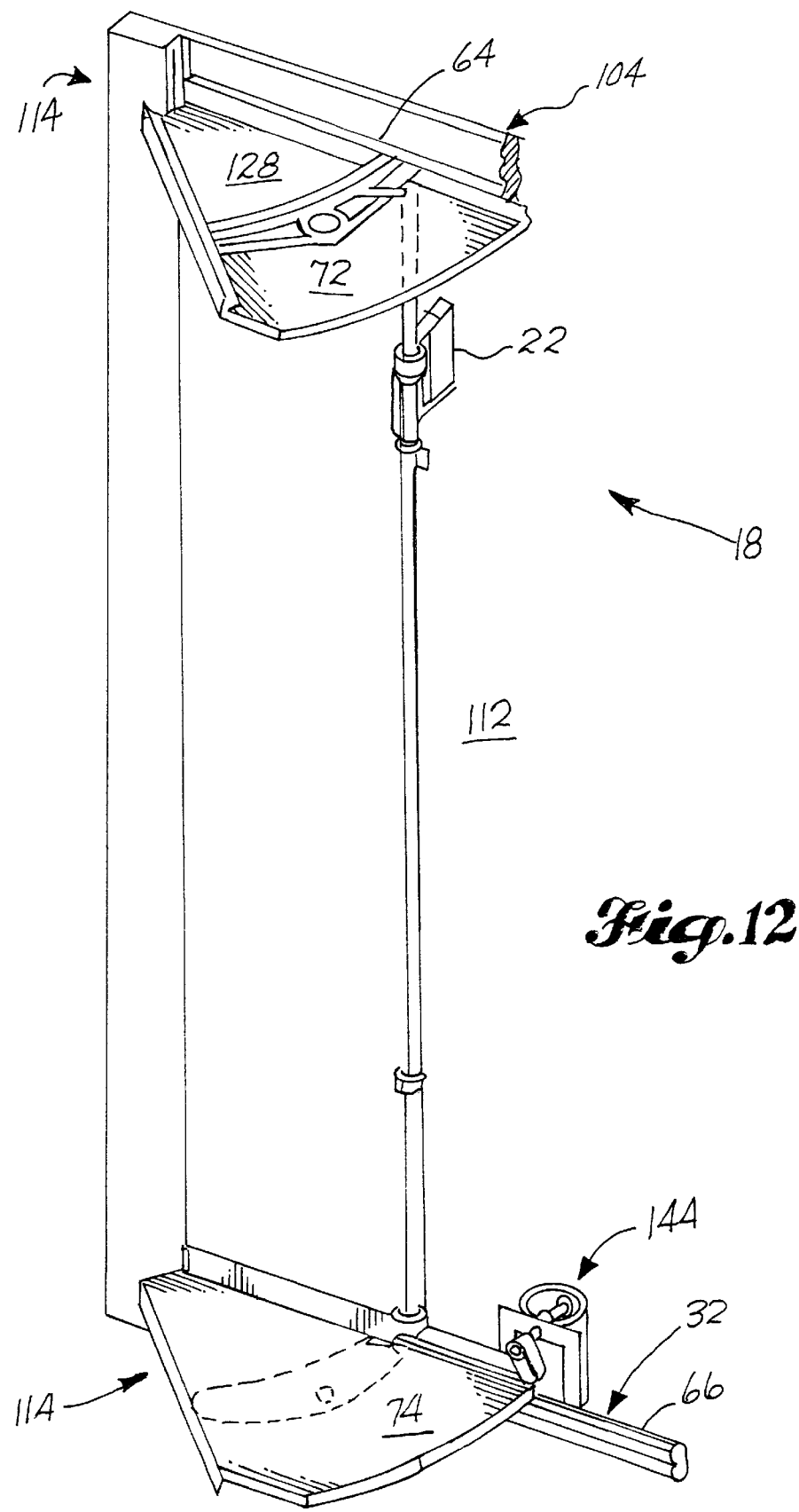
FIG. 12 is a simplified perspective view, looking from the outboard to the inboard of the airplane, showing the locking system of the present invention.

The locking system 18 fixedly positions the primary module 14, and thus the secondary module 16, in either a stowed or a deployed position. It must be released before the primary module and secondary module can be pivoted. FIG. 12 shows a portion of the primary pivotable module 14 in a stowed and locked position proximate the open wall 32. As shown in the somewhat simplified view of FIG. 12, the locking system 18 comprises a torque tube 112 and similar upper and lower locking system subassemblies 114 disposed at the top and bottom panels 72, 74 of the primary pivoting module 14.

Figure 13:
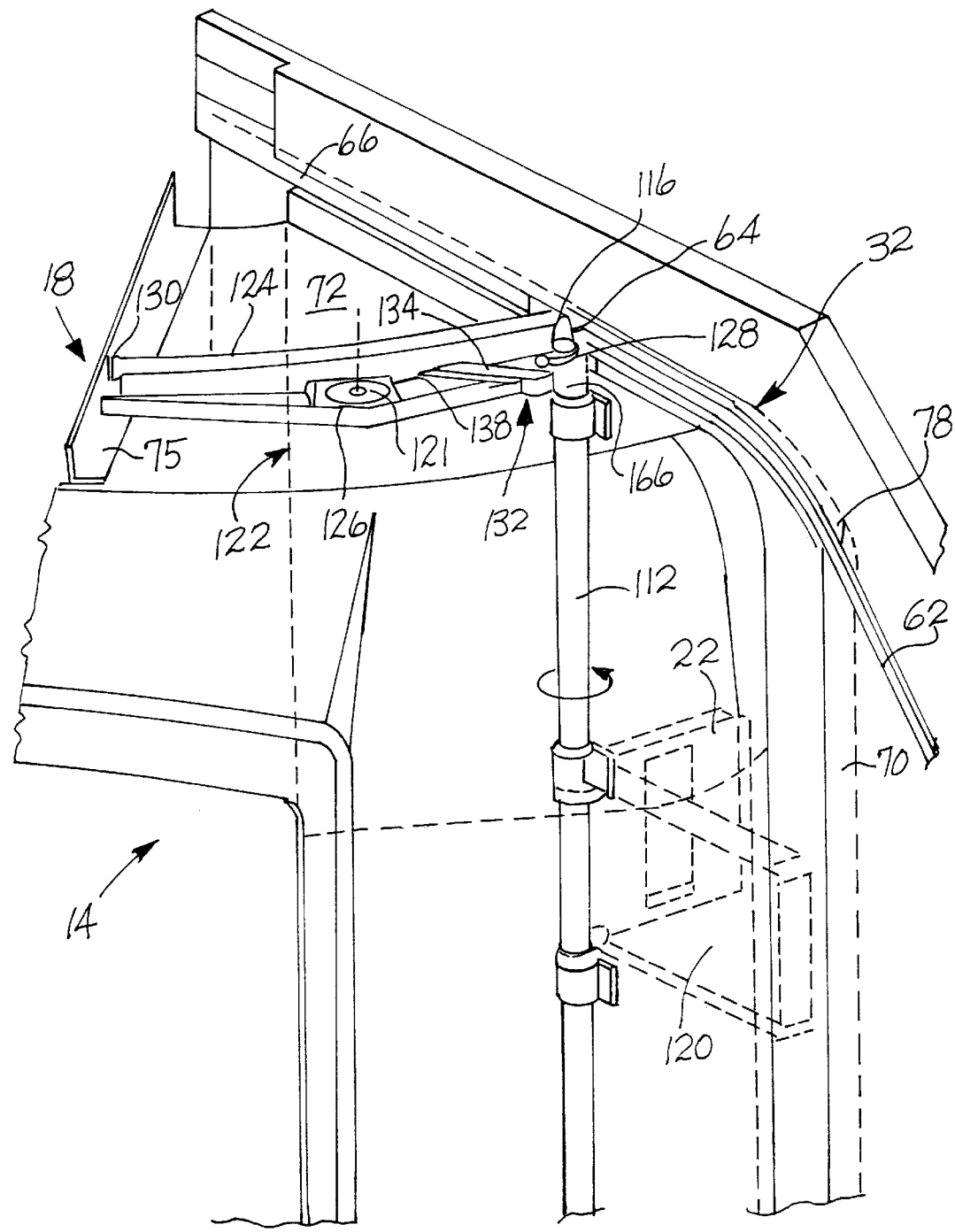
FIG. 13 is an enlarged perspective view showing the upper portion of the locking system of FIG. 12.
Figure 14:
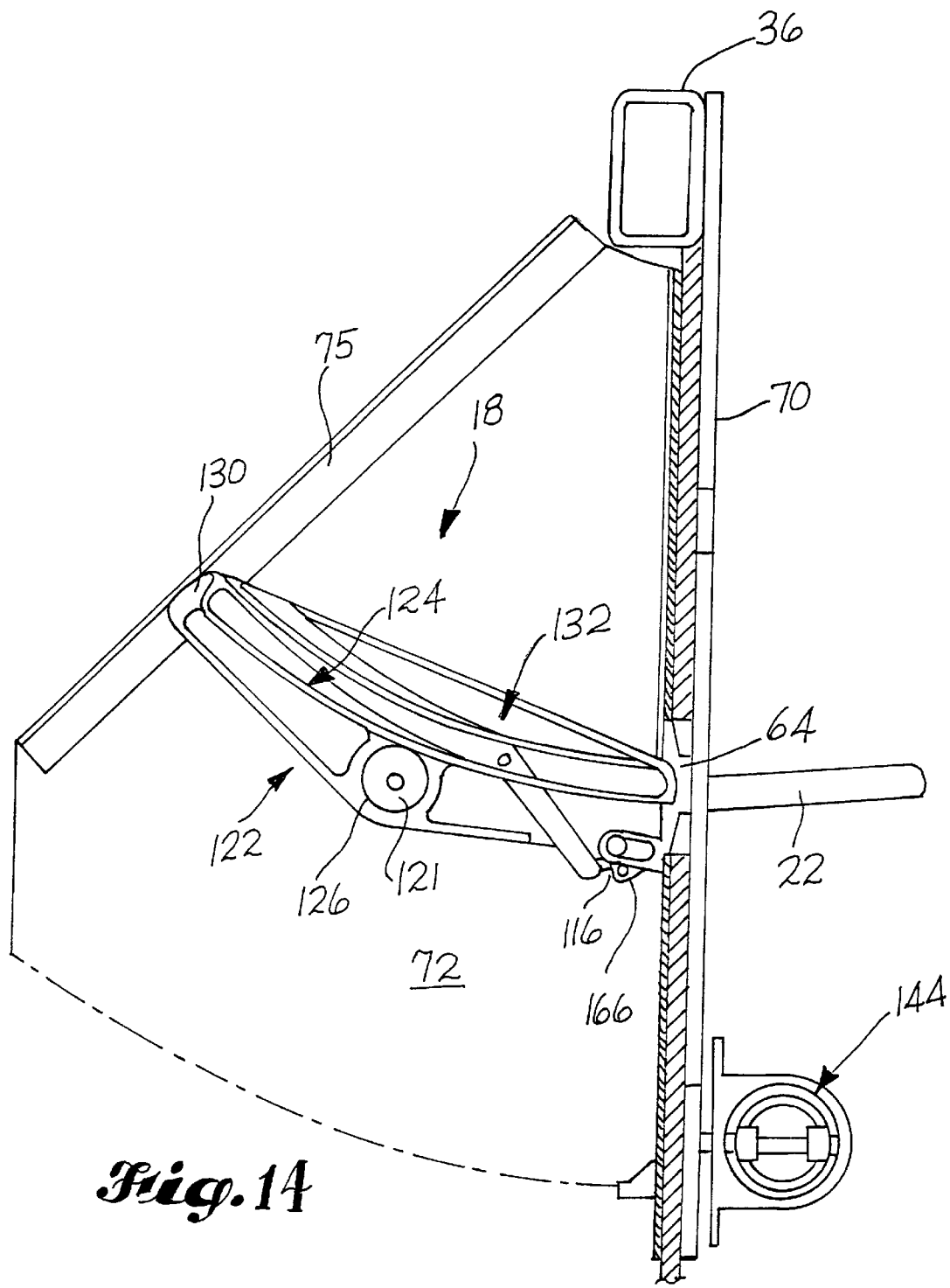
FIG. 14 shows a top view of the upper portion of the locking system of FIG. 12.
Figure 15:
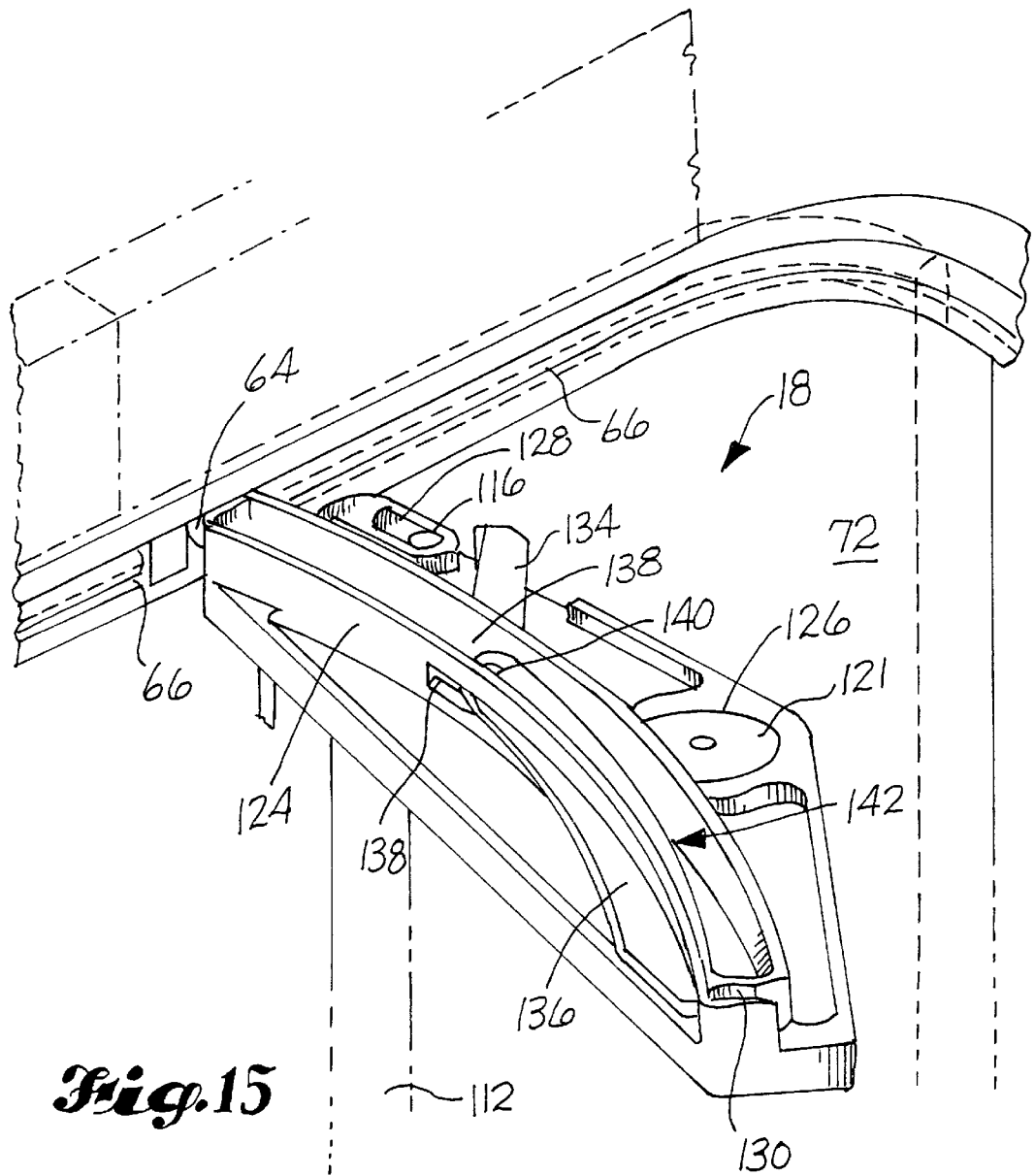
FIG. 15 shows the other side of the upper portion of the locking system of FIG. 12.

As is better illustrated in FIGS. 13–15, the torque tube 112 is rotatably supported on the interior surface of the primary movable wall 70. A pin 116, provided at the distal ends of the torque tube 112, is offset from its centerline. A latch grab handle 22(shown in solid lines in FIG. 12 and in phantom in FIG. 13) is suitably affixed to the torque tube 112. The grab handle 22 is accessible by a flight attendant from the exterior of the primary movable wall 70 and is attached to the torque tube 112 through a recessed escutcheon 120. The escutcheon 120 is formed on the outside of the primary movable wall 70. See FIGS. 1 and 2.

Since both locking system subassemblies 114 are similar, the following discussion will focus on the upper subassembly. The upper locking subassembly is pivotably attached as by a pin 121, to the top panel 72 of the primary movable module 14 and comprises a pivotable arcuately-shaped main rocker arm 122.

The rocker arm 122 comprises a raised rail 124, a rocker arm bearing 126, an elongated pin slot 128 disposed proximate the primary moving wall and a hook-shaped recess 130 disposed proximate the deployed position flange stop 75. The rocker arm bearing 126 is positioned about the pin 121 affixed to the top panel 72 of the primary pivotable module 14 whereby the rocker arm 122 may be pivoted in use. As perhaps best seen in FIGS. 14 and 15, the upper offset pin 116 of the torque tube is inserted into the pin slot 128 on the main rocker arm 122.

The upper locking subassembly 114 also comprises a safety stop subassembly 132. As best shown in FIGS. 13 and 15, the safety stop subassembly comprises a guide arm 134 and a safety stop arm 136 which act together as one unit. The guide arm 134 is inserted through slots 138 formed in the raised rail 124 and extends from the pin slot 128 to the hook shaped recess 130 of the arcuate rocker arm 122. The guide arm 134 is pivotably attached to the rocker arm by means of a pin 140 located within the raised rail 124 at a position intermediate its distal ends.

During movement between the stowed and deployed positions of the lavatory 10, the raised rail 124 on the main rocker arm 122 moves through the slot 64 in the outline edge of the open wall 32. One of the edges of the slot 64 forces the guide arm 134 against a (guide arm spring 142 to align with the raised rail thus positioning the safety stop arm 136 against an offset stop 166 affixed to the upper portion of the torque tube 112 below the offset pin 116 (see FIG. 13). The safety stop subassembly 132 prevents the torque tube 112 from turning and thus locks the main rocker arm 122 in line with the slot 64 formed in the sealed edge of the open wall 32. The purpose of the safety stop subassembly 132 is to prevent inadvertent closing of the grab handle 22 which would cause a jambing condition.

The basic concept of the present locking system is quite simple. It is analogous to a stick placed in the track of a sliding window to block it in either a closed or open position. Once the stick is removed, the window can be moved. In the present invention, the main rocker arm 122 functions as the stick and the deployed position stop 75 on the top panel 72 and the stowed position or overlap stop 78 formed on the primary moving wall 70 each functions, by analogy, as the window frame.

Referring now to the stowed position shown in FIGS. 12–14, in use, the grab handle 22 lays flat in the escutcheon 120 whereby when a flight attendant pulls the grab handle outward, the torque tube 112 turns accordingly (counter clockwise). As a result, the offset pin 116 pivots the rocker arm 122 away from a position where the rocker arm 122 is lodged against an edge of the slot 64 formed in the open wall 32 whereby the raised rail 124 may be aligned with the slot 64 formed in the sealed edge of the open wall 32. The primary pivoting module 14 is then free to pivot between the deployed position stop or flange 75 on the top panel 72 and the stowed position stop 78 formed on the primary moving wall 70.

A single flight attendant scat 20 may optionally be affixed to the exterior of the primary moving wall 70 of the primary pivotable module 14. See FIGS. 1 and 2. If used, the attendant's seat must always face aft and requires a support foot assembly 144 which transfer loads downwardly to the floor structure. The support foot assembly 144 is disposed on the lower exterior of the primary moving wall 70 proximate the airplane flooring. The optional support foot assembly 144 is not shown in FIGS. 1 or 2, but is in FIGS. 3 and 4.

The support foot assembly 144 is best illustrated in FIGS. 16–19 as comprising a support foot housing 146, a lockable foot 148 slidably positioned within the housing, a bottom leg pivotably pinned to the slidable foot as by a bottom pin 152, a top leg 154 pivotably pinned by means of a center pin 156 to the bottom leg 150 and securely affixed to a top leg shaft 158 supported by the support foot housing 146. The support foot assembly 144 also comprises a support foot control arm 160 securely affixed to the top leg shaft 158. The control aim 160 is pinned to a swivel end link 162 pinned to a control arm 164 affixed to the main rocker torque tube 112.

Figure 18:
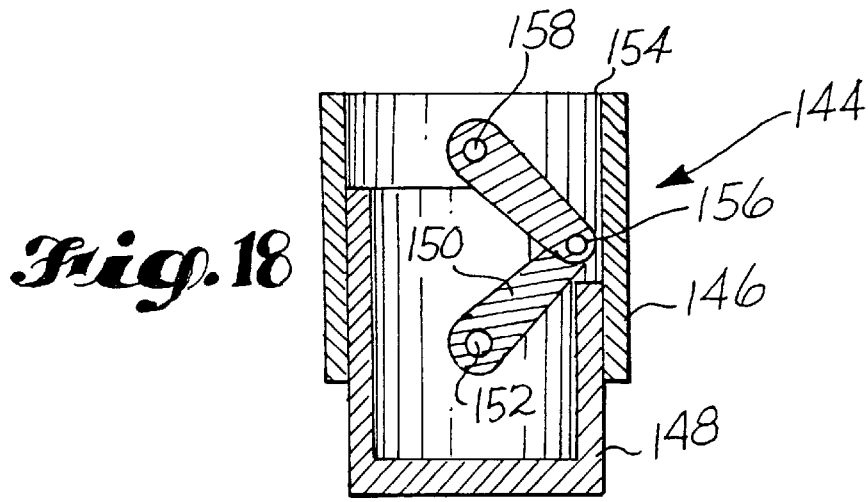
Figure 16:
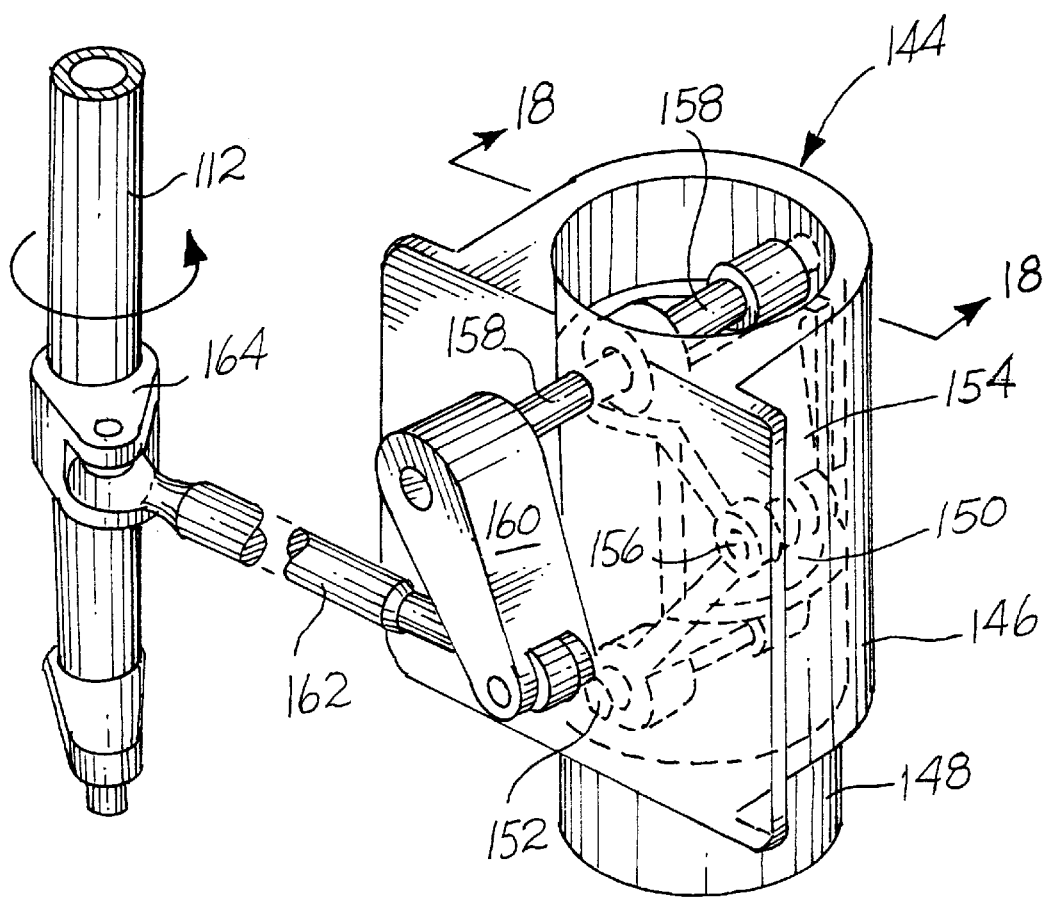

In use, the support foot 148 is moved off the floor only when the locking system 114 is disengaged allowing the primary module 14 to pivot. More particularly, in use, the support foot assembly 144 is controlled by the link 162 connected to the main rocker torque tube 112. When the shaft 112 is rotated counter clockwise to disengage the lock system 114, the control arm 164 pushes the link 162 outboard as shown in FIG. 16 which pushes the foot support control arm 160 towards the right in that figure. The control arm 160 thus pivots in a counterclockwise direction thereby rotating the top leg 154 in an upward direction as viewed in FIG. 16. As the upper leg 154 rotates upwardly, it pulls the bottom leg 150 upwardly through the center pin 156 which causes the support foot 148 to slide upwardly within the support foot housing 146 as is best seen in FIG. 18. To engage the support foot 148, the process is reversed as is perhaps best seen in FIGS. 17 and 19. In the engaged position, the top and bottom legs 154, 150 are positioned past the center of their pivot points and stop against the inside of the support foot 148.

Figure 20:
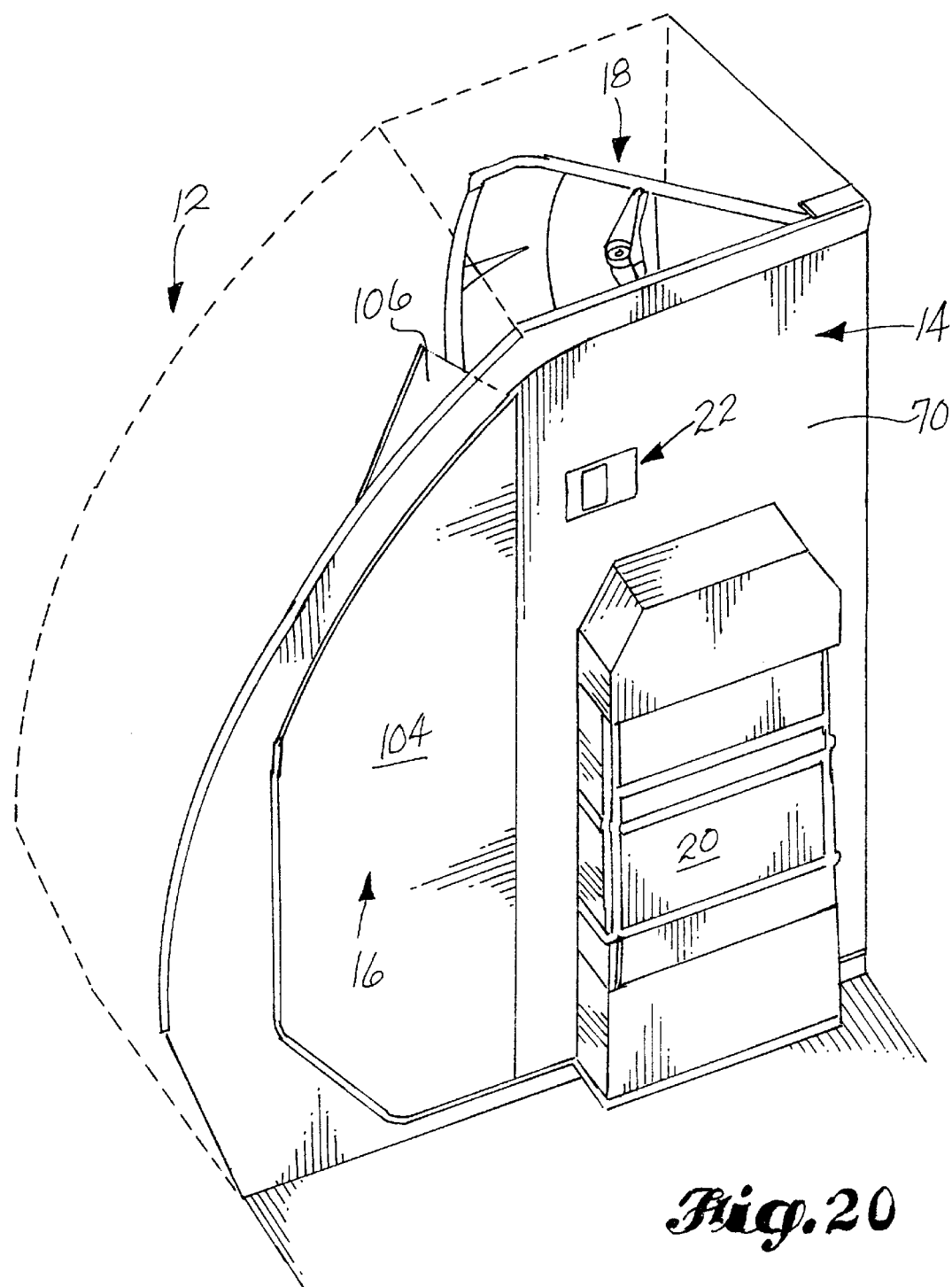
FIGS. 20, 21 and 22 show three stages in the deployment (and stowage) of the present dual pivot expandable lavatory.

In use, assuming that the lavatory 10 is in the stowed, locked position of FIG. 20 and a flight attendant wishes to deploy the unit, the grab handle 22 is pulled to the substantially perpendicular out position shown in in FIGS. 12, 13 (in phantom) and 14. This is a clear visual indication that the locking system 18 is disengaged. The primary module 14 may then be pulled out of the stationary subassembly 12 by the attendant.

Figure 21:
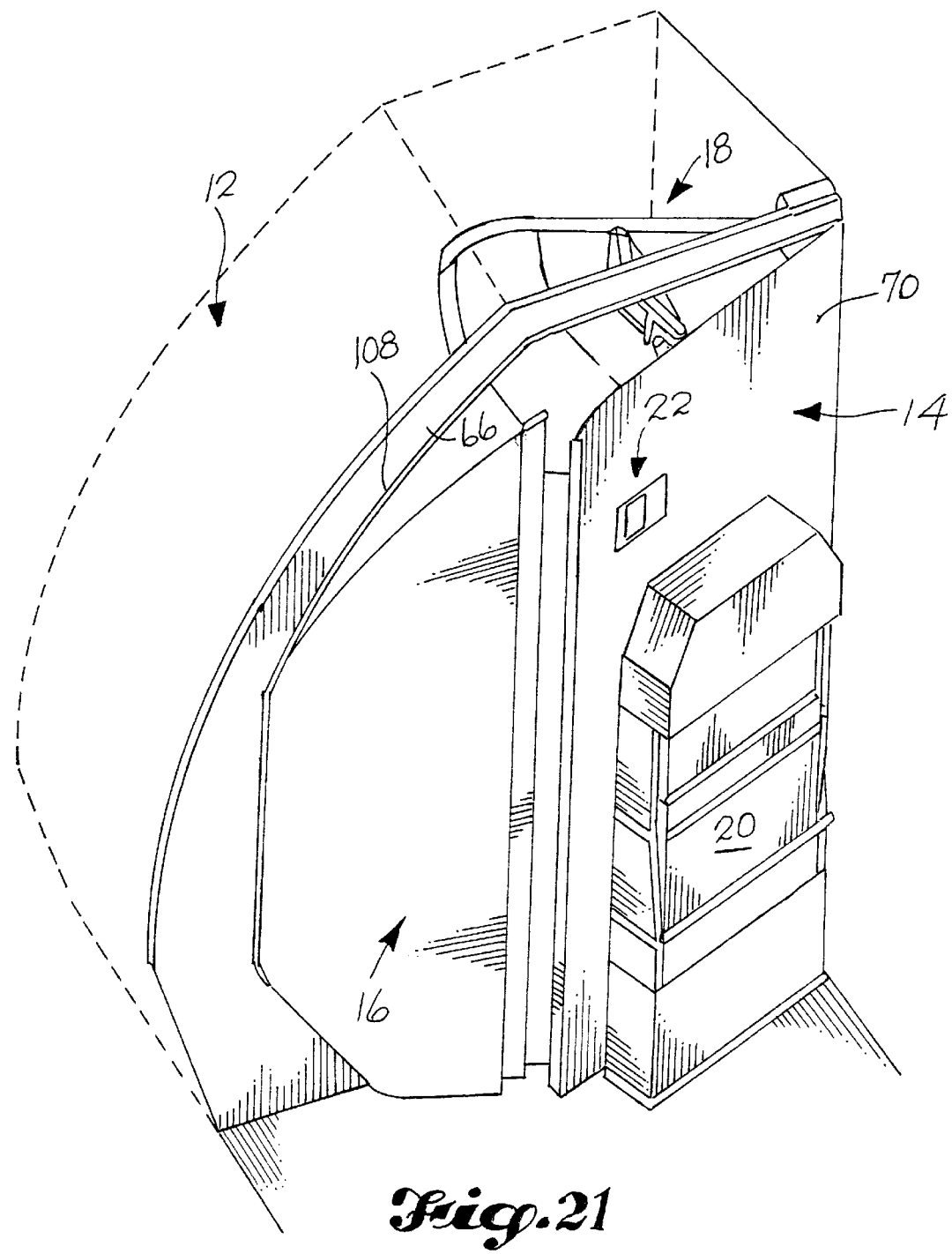
Figure 22:
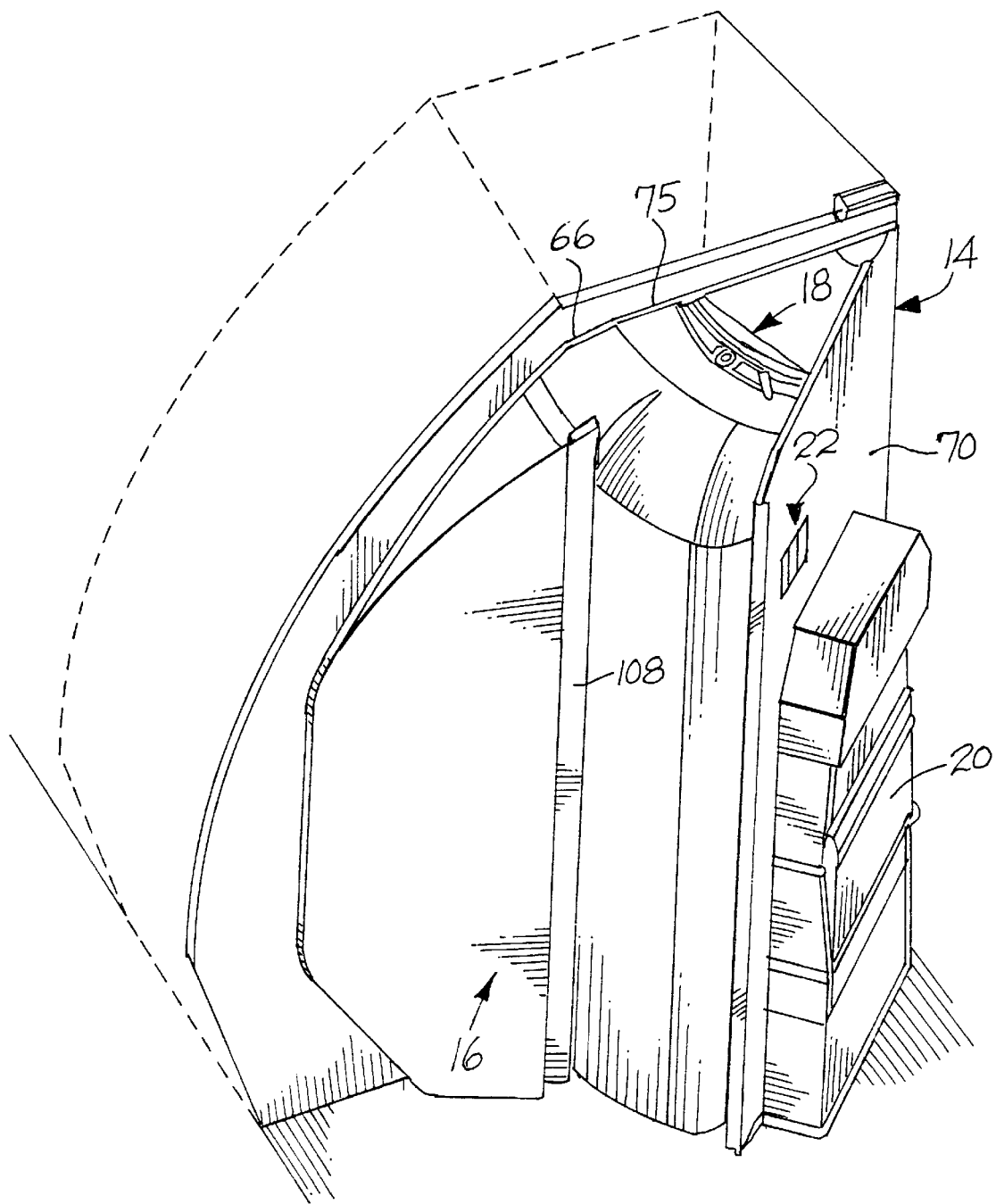

As seen in FIG. 21, the pivoting motion of the primary module 14 pushes the secondary module 16 outward as the secondary module 16 rolls over the primary shell 77 by means of the rollers 110 disposed on the inboard edge of the secondary moving wall 104 (see FIGS. 3 and 4, but especially FIGS. 8 and 9). Both modules continue outward until the secondary module 16 stops in place when the perimeter flange 108 is pulled against the scaled edge 66 of the open wall; see FIG. 21. The primary module 14 continues to move outwardly to the fully deployed position shown in FIG. 22 wherein the lock stops 75 are positioned against the perimeter seals 66 and the center seal 80 is positioned against the secondary shell 106.

The flight attendant returns the grab handle 22 to a position within the escutcheon 120 and the lock 114 is re-engaged. The expandable lavatory 10 is now ready for use. Stowing of the lavatory 10 is a reverse of the above wherein the locking system 18 is disengaged, the unit is pushed closed by the attendant and the locking system 18 is re-engaged.

While the principles of this invention have been described in connection with specific embodiments, it should be understood clearly that these descriptions are made only by way of example and are not intended to limit the scope of the invention.

What is claimed and desired to be secured by Letters Patent of the United States is:

1. An expandable lavatory comprising:
    (a) a stationary assembly having a substantially open side wall and a corner post attached to said side wall;
    (b) a stationary toilet assembly affixed within said stationary assembly;
    (c) a primary module pivotably attached to said corner post, said primary module being movable within said side wall from a stowed position substantially within said stationary assembly to a deployed position substantially outside of said stationary assembly;
    (d) a releasable locking assembly for securing said primary module in said stowed position and in said deployed position, and
    (e) a secondary module pivotably attached to said side wall and being movable within said side wall from a stowed position substantially within said stationary assembly to a deployed position substantially outside of said stationary assembly, said secondary module being provided with at least one roller for rolling contacting said primary module, whereby said secondary module moves when said primary module is moved.

2. An expandable lavatory disposed in an airplane, said airplane having a passenger doorway area, said lavatory comprising:
- (a) a stationary assembly disposed proximate said passenger doorway area, said stationary assembly comprising a side wall, a corner post affixed to said side wall and a lavatory door pivotably attached to said corner post;
- (b) a toilet assembly affixed within said stationary assembly away from said lavatory door;
- (c) a primary module pivotably attached to said post, said primary module being movable within an opening formed in said side wall from a stowed position substantially within said stationary assembly to a deployed position substantially outside of said stationary assembly within said doorway areas;
- (d) locking means for securing said primary module within said lavatory in said stowed position and in said deployed position, and
- (e) a secondary module pivotably attached to said side wall and being movable within said opening from a stowed position substantially within said stationary assembly to a deployed position substantially outside of said stationary assembly within said doorway area, said secondary module being provided with means for urging movement of said secondary module when said primary module is moved.

3. A process for using unused doorway space proximate a doorway disposed in an airplane, said process comprising:
- (a) disposing a stationary assembly proximate said passenger doorway area, said stationary assembly comprising a side wall having an opening, a corner post affixed to said side wall and a lavatory door pivotably attached to said corner hinge subassembly;
- (b) affixing a toilet assembly within said stationary assembly away from said lavatory door;
- (c) pivotably attaching a primary module to said corner post;
- (d) pivotably attaching a secondary module to said side wall;
- (e) providing said secondary module with means for urging movement of said secondary module when said primary module is pivoted
- (e) locking said primary module and said secondary module within said lavatory in a stowed position substantially within said stationary assembly;
- (f) unlocking said primary module and said secondary module when said airplane is in normal flight;
- (g) moving each of said modules within said opening from said stowed position to a deployed position substantially outside of said stationary assembly within said doorway area.

4. An expandable lavatory comprising:
- (a) a stationary assembly having a substantially open side wall;
- (b) a stationary toilet assembly affixed within said stationary assembly, said toilet having a plumbing system;
- (c) a primary module pivotably attached to said side wall, said primary module having a shell and being movable within said side wall from a stowed position substantially within said stationary assembly to a deployed position substantially outside of said stationary assembly, at least a portion of said plumbing system being supported within said shell;
- (d) a releasable locking assembly for securing said primary module in said stowed position and in said deployed position;
- (e) a secondary module pivotably attached to said side wall and being movable within said side wall from a stowed position substantially within said stationary assembly to a deployed position substantially outside of said stationary assembly, and
- (f) means for urging movement of said secondary module when said primary module is moved.

5. A process for increasing the number of passenger seats in an airplane, said airplane having an interior area proximate a passenger doorway, said process comprising:
- (a) positioning an expandable lavatory proximate said doorway area;
- (b) providing said expandable lavatory with a fixed shell containing a stationary toilet, said fixed shell having an open fixed wall, said stationary toilet having a plumbing system;
- (c) pivotably attaching a primary module to said fixed wall, said primary module having a first movable shell, at least a portion of said plumbing system being supported by said first movable shell, said primary module capable of being pivoted to a position within said doorway areas whereby space within said airplane may be saved and said lavatory may be used by passengers;
- (d) pivotably attaching a secondary module to another portion of said fixed wall, said secondary module being pivotable along with said secondary module to a position within said doorway area whereby space within said airplane may be saved by said expandable lavatory and said lavatory may be used by passengers, and
- (e) installing additional passenger seats in space saved by said lavatory, whereby the revenue generating potential of said airplane may be increased.

6. An expandable lavatory comprising:
- (a) a fixed lavatory subassembly of limited human-usable volume, said lavatory subassembly having an open sidewall;
- (b) a toilet affixed within said lavatory subassembly;
- (c) a corner post attached to said lavatory subassembly proximate said open side wall;
- (d) a primary module pivotably attached to said corner post, said primary module comprising a primary movable wall and a primary shell, said primary movable wall being pivotable between a stowed position abutting said open side wall and a deployed position away from said open side wall, said primary shell being attached to said primary movable wall and being capable of passing through said open side wall, and
- (e) a secondary module pivotably attached to said lavatory subassembly proximate said open side wall, said secondary module having a secondary movable wall and a secondary shell, said secondary shell being attached to said secondary movable wall and being capable of passing through said open side wall, said secondary movable wall being pivotable between a stowed position abutting said open side wall and a deployed position away from said open side wall, said secondary module interacting with said primary module, whereby when said primary module is pivoted away from said open side wall to said deployed position, said secondary module is also pivoted away from said open side wall and the human-usable volume of said expandable lavatory is increased, and when said primary module is pivoted into said stowed position, said secondary module is also pivoted into said stowed position.

7. The expandable lavatory of claim 6, further comprising:
   (a) a shroud comprising said toilet, said shroud having a contoured undersurface area capable of receiving said secondary shell;
   (b) said toilet being positioned within said lavatory subassembly proximate said open side wall, whereby when said secondary module is in said stowed position, said secondary shell may be received within said shroud undersurface area.

8. The expandable lavatory of claim 7, further comprising:
   (a) an overlap formed on said primary movable wall, and
   (b) an interior periphery disposed about said secondary shell and a continuous recessed flange disposed about said interior periphery, whereby when said primary module and said secondary module are in a stowed position, said continuous recessed flange sealingly cooperates with said primary movable wall overlap, said primary movable wall and said secondary movable wall forming a substantially continuous, smooth surface in said stowed position.

9. The expandable lavatory of claim 8, further comprising:
   (a) an outline edge disposed about said open side wall, said outline edge being provided with an elastomeric seal on both the exterior surface and the interior surface of said outline edge, and
   (b) a lip having an elastomeric seal extending along the exterior edge of said primary shell, and
   (c) an elastomeric seal disposed on said continuous recessed flange, whereby when said primary module and said secondary primary module are in said deployed position, said lip seal is abuttingly contacted by said outline edge seal and said continuous recessed flange seal thereby providing privacy for an occupant of said expandable lavatory.

10. The expandable lavatory of claim 9, further comprising a locking system assembly fixedly positioning said primary module and said secondary module in said stowed position or in said deployed position.

11. The expandable lavatory of claim 10, wherein said locking system assembly comprises:
   (a) a torque tube;
   (b) a latch grab handle supported within said primary module, said grab handle being affixed to said torque tube and capable of rotating said torque tube;
   (c) an upper locking system subassembly coupled to said torque tube, and
   (c) a lower locking system subassembly coupled to said torque tube, whereby when said torque tube is rotated by said latch handle, said upper locking system and said lower locking system are released and said primary module and said secondary module may be pivoted either from said stowed position to said deployed position or from said deployed position to said stowed position.

12. The expandable lavatory of claim 11, wherein said upper locking system subassembly is pivotably attached to an upper portion of said primary shell, and said lower locking system subassembly is pivotably attached to a lower portion of said primary shell.

13. The expandable lavatory of claim 12, wherein said upper locking system subassembly comprises:
   (a) a rocker arm pivotably attached to said upper portion, said rocker arm comprising a plurality of arcuately-shaped raised rails, an elongated pin slot disposed proximate said primary movable wall, and a hook-shaped recess disposed proximate a deployed position flange stop affixed to said upper portion;
   (b) an offset pin disposed on the upper portion of said torque tube, said upper offset pin being inserted within said elongated pin slot, and
   (c) a safety stop subassembly comprising a guide arm and a safety stop arm which act together as one unit, said guide arm being inserted into a slot formed in each of said raised rails, said guide arm extends from said elongated pin slot to said hook shaped recess, said guide arm being pivotably attached to said rocker arm between said raised rails, said guide arm being pivotable from a first position to a second position alignable with said raised rails when said primary module and said secondary module are being moved between said stowed position and said deployed position, said guide arm being springingly biased towards said first position, whereby in use, when said grab handle rotates said torque tube in one direction, said offset pin pivots said rocker arm permitting said primary module move.

14. The expandable lavatory of claim 13, wherein said lower locking system subassembly comprises:
   (a) a rocker arm pivotably attached to said lower portion, said rocker arm comprising a plurality of arcuately-shaped raised rails, an elongated pin slot disposed proximate said primary movable wall, and a hook-shaped recess disposed proximate a deployed position flange stop affixed to said tipper portion;
   (b) an offset pin disposed on the lower portion of said torque tube, said lower offset pin being inserted within said elongated pin slot, and
   (c) a safety stop subassembly comprising a guide arm and a safety stop arm which act together as one unit, said guide arm being inserted into a slot formed in each of said raised rails, said guide arm extends from said elongated pin slot to said hook shaped recess, said guide arm being pivotably attached to said rocker arm between said raised rails, said guide arm being pivotable from a first position to a second position alignable with said raised rails when said primary module and said secondary module are being moved between said stowed position and said deployed position, said guide arm being springingly biased towards said first position, whereby in use, when said grab handle rotates said torque tube in said one direction, said offset pin pivots said rocker arm permitting said primary module to move.

15. The expandable lavatory of claim 12, wherein said primary movable wall is provided with a seat.

16. The expandable lavatory of claim 15, wherein said primary movable wall is provided with a secondary locking system assembly for securing said primary module in said stowed position and in said deployed position.

* * * * *